United States Patent [19]

Payne et al.

[11] Patent Number: 4,493,980
[45] Date of Patent: Jan. 15, 1985

[54] POWER CONTROL ARRANGEMENT FOR AUTOMATIC SURFACE UNIT

[75] Inventors: Thomas R. Payne; David A. Schneider, both of Louisville, Ky.

[73] Assignee: General Electric Company, Louisville, Ky.

[21] Appl. No.: 586,052

[22] Filed: Mar. 5, 1984

[51] Int. Cl.³ ............................................. H05B 1/02
[52] U.S. Cl. .................... 219/450; 219/452; 219/489; 219/494; 219/518; 219/453
[58] Field of Search ............... 219/445, 446, 447, 448, 219/449, 450, 451, 452, 453, 459, 489, 492, 494, 518

[56] References Cited

U.S. PATENT DOCUMENTS

| | | | |
|---|---|---|---|
| 2,767,293 | 10/1956 | Jordan et al. | 219/489 |
| 2,838,645 | 6/1958 | Welch | 219/452 |
| 3,118,044 | 1/1964 | Holtkamp | 219/450 |
| 3,819,906 | 6/1974 | Gould, Jr. | 219/506 |
| 4,214,150 | 7/1980 | Cunningham | 219/452 |
| 4,217,481 | 8/1980 | Fischer | 219/450 |
| 4,241,289 | 12/1980 | Bowling | 219/450 |
| 4,334,145 | 6/1982 | Norris | 219/453 |
| 4,394,565 | 7/1983 | Dills | 219/452 |

OTHER PUBLICATIONS

Technical Paper—Presented to ASME by A. Myklebust et al.—"Microcomputer Control of a Residential Range Top for Energy Conservation"—Aug. 1982.
Technical Paper—International Appliance Technical Conf.—May 1983—Terai et al., "Boiling Point Detector for Surface Cooking Unit"—pp. 421-440.

Primary Examiner—Volodymyr Y. Mayewsky
Attorney, Agent, or Firm—H. Neil Houser; Radford M. Reams

[57] ABSTRACT

A power control arrangement for an automatic surface unit in a cooking appliance which enables the user to select Warm, Simmer, Boil and Fry cooking modes and to select from a plurality of heat settings for each mode. The heat settings for each mode have associated with them a minimum steady state temperature and a steady state power level. The control system compares the output from a utensil temperature sensor with various reference values determined by the mode and heat setting selected and depending upon the comparison, operates the surface unit at the corresponding steady state power level or at a transient power level to rapidly bring the utensil temperature to the desired temperature for the selected mode and heat setting with minimum temperature overshoot.

14 Claims, 17 Drawing Figures

POWER CONTROL ARRANGEMENT FOR AUTOMATIC SURFACE UNIT

CROSS REFERENCE TO A RELATED APPLICATION

This application relates to commonly-assigned copending U.S. patent application Ser. No. 586,351, "Boil Dry Detection Arrangement," filed in the name of Thomas R. Payne, the specification of which is hereby incorporated by reference.

BACKGROUND OF THE INVENTION

This invention relates generally to an improved power control arrangement for a surface heating unit in a cooking appliance such as a domestic electric range, and more particularly to a control arrangement which includes a temperature sensor responsive to the temperature of a utensil resting on the surface heating unit.

Various surface unit power control arrangements utilizing a utensil temperature sensing device have been developed in the past, some of which are presently in use in commercially available domestic ranges. Typically, such systems generally referred to as automatic surface units, include a temperature sensing device such as a bimetallic device or thermistor device mounted so as to be in thermal contact with the utensil. Current to the heating element is controlled as a function of the state of the sensing device. When the sensed temperature is less than a predetermined threshold temperature set by user manipulation of input control knobs or switches mechanically coupled to the sensor device and operative to vary the threshold as a function of user input, the heating element is energized at full power, and when the temperature exceeds the threshold the heating element is de-energized. Such electromechanical sensing and control devices, due at least in part to the tolerance buildup, are inherently inaccurate both in temperature sensing and in controlling power in response to the sensed temperature. The latter problem results, at least in part, from an inability of such controls to provide small duty cycle changes, particularly at low duty cycles, i.e. duty cycles less than 50%. Consequently, the temperature control performance of such controls is characterized by undesirably large overshoots and undershoots about an inaccurate nominal temperature.

In view of the above-described shortcomings of automatic surface unit control arrangements known in the art, a control arrangement which accurately senses utensil temperature and which provides relatively tight temperature control with minimal temperature overshoot would be highly desirable.

It is therefore an object of the present invention to provide an improved power control arrangement for an automatic surface unit which provides reliable temperature control by accurately measuring utensil temperature and which provides a rapid thermal response to changes in heat setting selections or changes in utensil load affecting temperature in both Boil and Fry operating Modes, while limiting the temperature overshoot and undershoot.

It is a further object of the present invention to provide a power control arrangement of the aforementioned type which incorporates an electronic controller to implement a plurality of operating modes to provide accurate temperature control and fast thermal response for a variety of different loads and cooking objectives.

SUMMARY OF THE INVENTION

The present invention provides an improved power control arrangement for a cooking appliance incorporating an automatic surface heating unit. The surface unit is adapted for supporting and heating a cooking utensil placed thereon and is adapted for energization by an external power supply. Temperature sensing means is provided for sensing the temperature of the utensil when supported on the surface unit. User operable input selector means enables the user to select one of a plurality of cooking modes including a Fry Mode for heating food loads to one of a plurality of user selectable temperatures and a general Boil Mode enabling the user to efficiently control the heating of loads comprising in large part a water or water-base liquid. In addition, the user may select for each mode one of a plurality of different heat settings, each heat setting for each mode having associated with it a predetermined steady state power level and, except for the actual Boil Mode, a predetermined steady state temperature range. Electronic control means controls energization of the surface unit in response to inputs from the temperature sensing means and the user input selector means. The control means is operative in the Fry Mode to generate an error signal as a function of the difference between the sensed utensil temperature and the steady state temperature range for the selected heat setting. The control means operates the surface unit at an applied power level which exceeds the steady state power level for the selected heat setting by a number of power levels determined as a function of the error signal. The applied power level approaches the steady state power level for the selected heat setting as the error signal approaches zero, whereby the utensil is rapidly brought to the selected temperature range with minimal temperature overshoot.

The power control arrangement in accordance with the present invention may further include means for implementing a Warm Mode in which the surface unit is operated at a relatively low power setting when the sensed utensil temperature is less than a predetermined minimum warm reference temperature and operated at a power level corresponding to the selected heat setting when the sensed utensil temperature is between the minimum warm reference temperature and a predetermined maximum warm reference temperature and to de-energize the surface unit when the sensed utensil temperature exceeds the predetermined maximum warm reference temperature. The maximum reference temperature for this mode is empirically determined to be significantly less than a sensed utensil temperature indicative of the presence of boiling water in the utensil.

In accordance with yet another aspect of the invention, the control means is operative to implement a Simmer Mode in which the surface unit is operated at a predetermined relatively high power level for a sensed utensil temperature less than a predetermined minimum simmer reference temperature; at a predetermined intermediate power level lower than said first power level when the sensed utensil temperature is between the minimum simmer reference temperature and a predetermined intermediate simmer reference temperature; at a steady state power level associated with the selected heat setting for sensed utensil temperatures between intermediate reference temperature and a predetermined maximum simmer reference temperature; and finally to de-energize the surface unit when the sensed temperature exceeds the maximum simmer reference temperature. The minimum intermediate and maximum simmer reference temperatures and the predetermined high and intermediate power levels are selected so as to rapidly bring the temperature of the contents of the utensil to near its boiling temperature without boiling and to hold the contents near the boiling point without boiling.

In accordance with yet another aspect of the present invention, the control means is further operative to implement an actual Boil Mode in which the surface unit is operated at a predetermined relatively high power level when the sensed utensil temperature is less than a predetermined minimum boil reference temperature and to operate the surface unit at a power level corresponding to the selected heat setting when the sensed utensil temperature is greater than the minimum boil temperature. The minimum reference temperature is selected to insure that the water will boil regardless of heat setting. The various heat settings enable the user to select the desired boiling rate, for a variety of utensil configurations and water volumes.

While the novel features of the invention are set forth with particularity in the appended claims, the invention, both as to organization and content will be better understood and appreciated from the following detailed description taken in conjunction with the drawings.

DETAILED DESCRIPTION OF THE ILLUSTRATIVE EMBODIMENT

A. Overview

Figure 1:
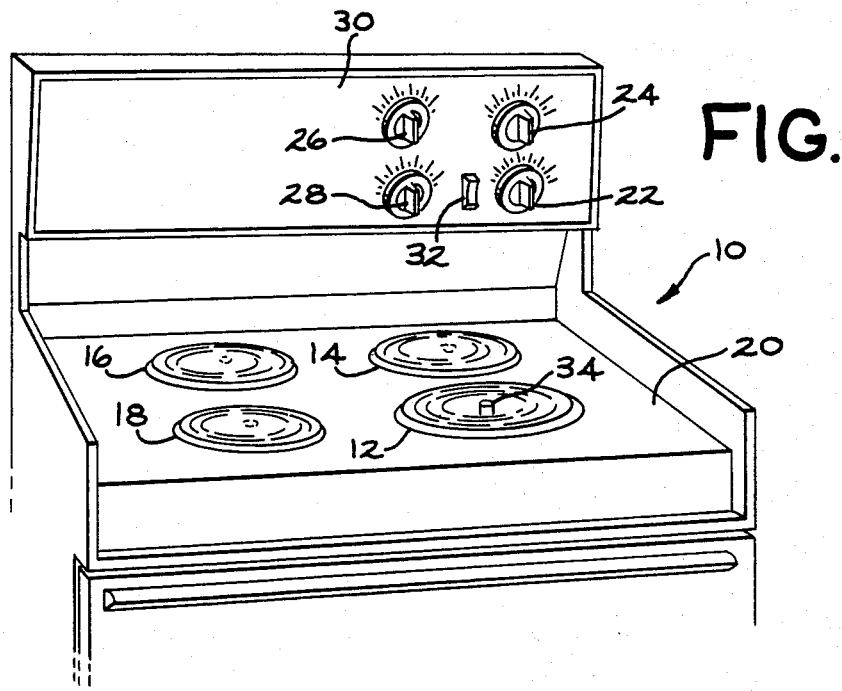
FIG. 1 is a front perspective view of a portion of an electric range illustratively embodying the power control arrangement of the present invention.

FIG. 1 illustrates an electric range 10 incorporating a control arrangement illustratively embodying the present invention. Range 10 includes four conventional electric surface units comprising resistive heating elements 12, 14, 16 and 18 supported from a substantially horizontal support surface 20. Each of elements 12–18 are adapted to support cooking utensils, such as frying pans, sauce pans, tea kettles, etc., placed thereon for heating. Manually operable rotary control knobs 22, 24, 26 and 28 are mounted to control panel 30. Control knobs 24, 26 and 28 enable the user to select the desired power level for heating elements 14, 16 and 18, respectively in a conventional manner. Heating element 12 is arranged to function as an automatic surface unit, that is, energization of element 12 is controlled as a function of the temperature of the utensil being heated thereon. It is common practice to provide only one automatic surface unit in a multiple unit range or cooktop. However, multiple automatic surface units could be provided.

Figure 2:
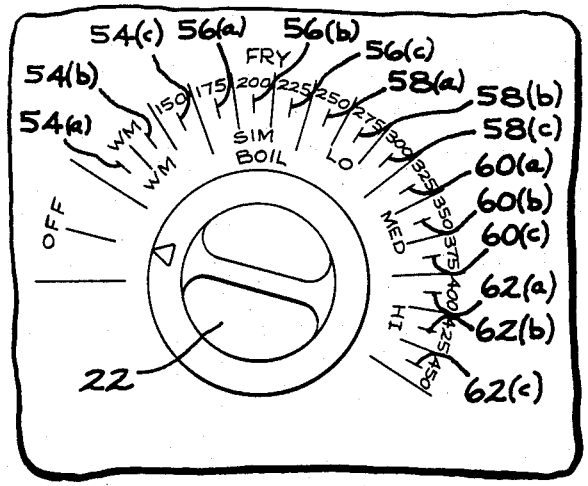
FIG. 2 is a greatly enlarged view of a portion of the control panel of the range of FIG. 1 showing the details of one of the control knobs thereof.

The sensed utensil temperature sensed by temperature sensing device 34 is used in implementing a plurality of operating modes for element 12 including a Fry Mode and a general Boil Mode. The general Boil Mode comprises several actual Boil Modes, a Warm Mode and a Simmer Mode. Mode selection switch 32 on control panel 30 enables the user to select the Fry Mode or the general Boil Mode for heating element 12. As best seen in FIG. 2, control knob 22 enables the user to select a plurality of heat settings for the Fry Mode and for the general Boil Mode, Warm, Simmer and the actual Lo, Med and Hi Boil Modes, and to select from a plurality of heat settings within each of these modes as well.

Figure 3B:
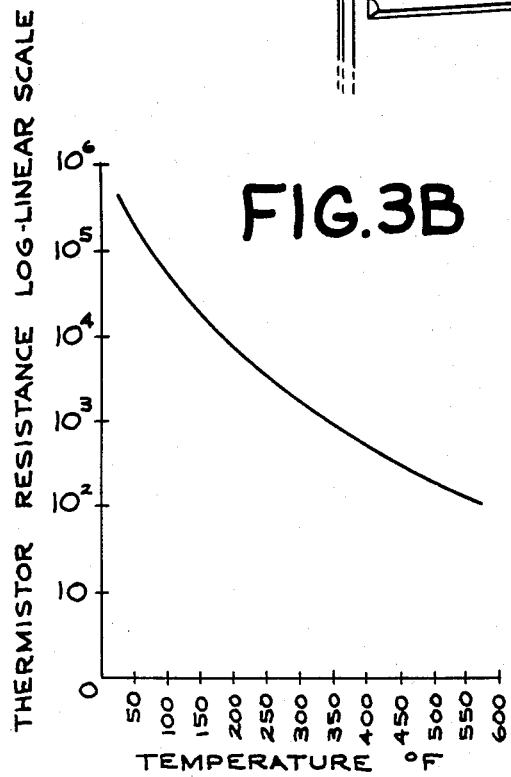
FIG. 3B is a graphic representation of the resistance versus temperature characteristic for the temperature sensor of FIG. 2A.
Figure 3A:
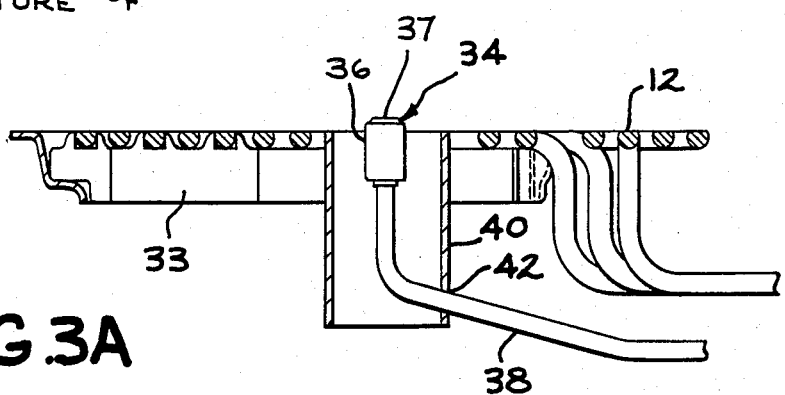
FIG. 3A is a sectional side view of a surface unit of the type incorporated in the range of FIG. 1 showing the temperature sensor.

The utensil temperature sensing arrangement employed in the illustrative embodiment will now be described with reference to FIG. 3A. Surface unit heating element 12 is supported on spider arms 33. The temperature sensor apparatus designated generally 34 includes a housing 36 mounted on one end of an elongated, generally L-shaped tubular arm 38.

A cylindrical shield 40 of low thermal mass metal forms the central core to which the radial spider arms 33 are attached and also serves to shield sensor housing 36 from radiated heat from heating element 12. Arm 38 extends through a slot 42 in shield 40, and bears against the upper end of the slot to hold housing 36 in the proper position slightly above the element 12 so as to cause the uppermost surface 37 of housing 36 to resiliently contact the bottom of a cooking utensil when it is placed on heating element 12. The temperature sensitive element (not shown) of the sensor contained within housing 36 is a conventional negative temperature coefficient thermistor having a resistance vs temperature characteristic as shown in FIG. 3B. The structural details of this sensor arrangement do not form any part of the subject invention and are thus described only to the extent necessary for an understanding of the present invention. Such devices are described in greater detail in commonly assigned U.S. Pat. No. 4,241,289, the disclosure of which is hereby incorporated by reference.

Figure 4:
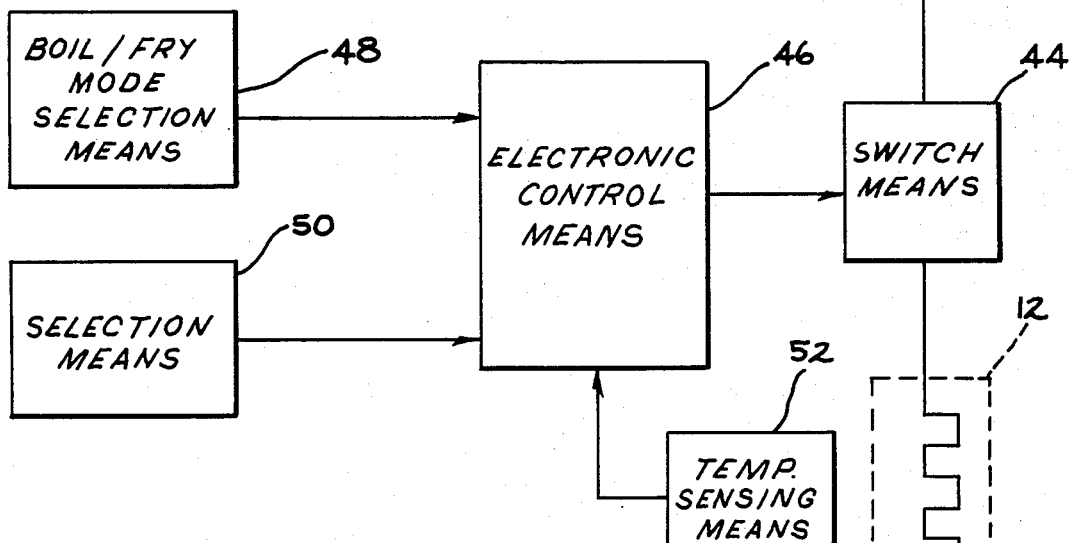
FIG. 4 is a greatly simplified functional block diagram of the control arrangement employed in the range of FIG. 1 incorporating the power control arrangement of the present invention.

A generalized functional block diagram of the power control arrangement for heating element 12 of range 10 is shown in FIG. 4 wherein heating element 12 is energized by a standard 60 Hz AC power signal which can be either 120 or 240 volts supplied to terminals L1 and L2. Power to element 12 is controlled by switch means 44 connected in series with element 12. Switch means 44 is switched into and out of conduction by control signals generated by electronic control means 46.

Electronic control means 46 generates power control signals in response to inputs from the user operable input selection means comprising Boil/Fry Mode selection means 48 and heat setting selection means 50, and inputs from temperature sensing means 52 which senses the temperature of the utensil being heated by element 12. The output of Boil/Fry Mode selection means 48 represents the state of mode selection switch 32 (FIG. 1) indicating to control means 46 whether the general Boil or Fry Mode has been selected. The output of heat setting selector means 50 represents the heat setting selected by the user by manipulation of control knob 22 (FIGS. 1,2).

In the illustrative embodiment, electronic control means 46 controls the power level applied to heating element 12 by controlling the duty cycle of heating element 12, i.e., the percentage of time power is applied to heating element 12. A predetermined control period comprising a fixed number of control intervals is employed as the time base for power control. The ratio of conductive control intervals to the total number of control intervals in the control period, expressed as a percentage, is hereinafter referred to as the duty cycle. Preferably each control interval comprises eight full cycles of the standard 60 Hz 240 volt AC power signal corresponding to a time period of approximately 133 milliseconds. Each control period comprises 32 control intervals corresponding to time period of approximately 4 seconds. The duration for the control interval and control period selected provide a satisfactory range of heat settings for desired cooking performance and can be programmed to make efficient use of microprocessor memory. It is understood, however, that control intervals and control periods of greater and lesser duration could be similarly employed. Electronic control means 46 selectively implements one of sixteen different duty cycle power levels, including a zero duty cycle or OFF level. Table I shows the percentage ON time, i.e. the duty cycle and the number of conductive control intervals per control period for each of sixteen available power levels.

TABLE I

| Power Level | % On Time | On Control Intervals Per Control Period | Hex Rep M(KB) |
| --- | --- | --- | --- |
| OFF | 0 | 0 | 0 |
| 1 | 3 | 1 | 1 |
| 2 | 6.5 | 2 | 2 |
| 3 | 9 | 3 | 3 |
| 4 | 12.5 | 4 | 4 |
| 5 | 16 | 5 | 5 |
| 6 | 22 | 7 | 6 |
| 7 | 25 | 8 | 7 |
| 8 | 31.5 | 10 | 8 |
| 9 | 37.5 | 12 | 9 |
| 10 | 44 | 14 | A |
| 11 | 50 | 16 | B |
| 12 | 62.5 | 20 | C |
| 13 | 75 | 24 | D |
| 14 | 87.5 | 28 | E |
| 15 | 100 | 32 | F |

It will be recalled that one objective of the present invention is to rapidly bring the utensil to the steady state temperature associated with the selected mode and heat setting with minimal temperature overshoot, in both a general Boil Mode and a Fry Mode. To this end, as shown in Table II, in accordance with one aspect of the invention, each heat setting, except for the actual Boil Mode settings, that is, the Lo, Medium and Hi mode, has associated with it a predetermined steady state temperature range, and steady state power level. The steady state power level associated with each heat setting is the heat setting which under most operating conditions delivers sufficient energy to the load to hold the sensed utensil temperature in the desired steady state range with relatively little temperature excursion above or below this range. The temperature ranges and power levels for each heat setting for both the generalized Boil Mode and the Fry Mode are presented in Table II.

TABLE II

| Hexadecimal Representation of Setting (KB) | Fry Mode | | | Boil Mode | | |
| --- | --- | --- | --- | --- | --- | --- |
| | Selected Heat Setting | Steady State Utensil Temp. Range °F. | Steady State Power Level M(KB) | Selected Heat Setting | Steady State Utensil Temp. Range °F. | Steady State Power Level M(KB) |
| 0 | OFF | — | 0 | OFF | — | 0 |
| 1 | Wm(1) | 0–120 | 3 | Wm(1) | 0–120 | 3 |
| 2 | Wm(2) | 121–146 | 3 | Wm(2) | 121–146 | 3 |
| 3 | 150 | 147–166 | 5 | Wm(3) | 147–166 | 4 |
| 4 | 175 | 167–197 | 6 | Sim(1) | 198–219 | 4 |
| 5 | 200 | 198–219 | 7 | Sim(2) | 198–219 | 5 |
| 6 | 225 | 220–240 | 8 | Sim(3) | 198–219 | 6 |
| 7 | 250 | 241–268 | 8 | Lo(1) | 220– | 8 |
| 8 | 275 | 269–286 | 9 | Lo(2) | 220– | 9 |
| 9 | 300 | 287–315 | A | Lo(3) | 220– | A |
| A | 325 | 316–335 | B | Med(1) | 220– | B |
| B | 350 | 336–359 | B | Med(2) | 220– | B |
| C | 375 | 360–386 | C | Med(3) | 220– | C |
| D | 400 | 387–422 | D | Hi(1) | 220– | D |
| E | 425 | 423–443 | D | Hi(2) | 220– | E |

TABLE II-continued

| | Fry Mode | | | Boil Mode | | |
|---|---|---|---|---|---|---|
| Hexadecimal Representation of Setting (KB) | Selected Heat Setting | Steady State Utensil Temp. Range °F. | Steady State Power Level M(KB) | Selected Heat Setting | Steady State Utensil Temp. Range °F. | Steady State Power Level M(KB) |
| F | 450 | 444–472 | D | Hi(3) | 220– | E |

In addition to the steady state considerations, rapid transient response to changes in heat settings without extreme temperature overshoots and undershoots is achieved in accordance with the present invention by the implementation in each of the modes of power levels other than the steady state levels when the sensed utensil temperature lies outside the desired temperature range, that is higher power levels when the sensed temperature is below the steady state range and lower power levels or the zero level when sensed temperature is above the steady state range. The transient power levels are intended to rapidly return the sensed utensil temperature to the desired range, however, the transient power levels for each mode are also tailored to the heating objective of the selected mode and the general nature of the load being heated.

For example, in the Fry Mode it is typically desirable to bring the utensil to a relatively narrow temperature range quickly but with minimal overshoot. However, the thermal inertia of the heating element, particularly at high power levels coupled with the relatively slow temperature response of the load, can result in substantial undesirable temperature overshoots. The Fry Mode, in accordance with the present invention, provides rapid response while avoiding the temperature overshoot by operating the heating element at power levels considerably higher than the steady state level when the difference between steady state temperature and sensed utensil temperature is great, and gradually decreasing the power level toward the steady state level as the sensed utensil temperature approaches the desired steady state temperature range.

By contrast, in the Boil Mode, where temperature overshoot is of much less concern due to the isothermal nature of boiling water loads, the heating element can be operated at full power until closely approaching the boiling point before lowering the power level to the desired steady state level. An overview of each of the modes provided in accordance with the present invention will now be prsented. A more detailed description of the implementation of each mode follows thereafter with reference to the control circuit of FIG. 5.

A.(1) FRY Mode

The Fry Mode is intended to rapidly bring the temperature of the utensil to the selected relatively narrow operating temperature range while avoiding extensive temperature overshoots and undershoots which can adversely affect cooking performance. In the Fry Mode relatively tight control over the steady state operating temperature of the heating element is desired in the heating of a wide variety of food loads. To this end a relatively narrow steady state temperature range is provided for each of the Fry Mode heat settings. The temperature range associated with each heat setting for the Fry Mode in the illustrative embodiment is shown in Table II.

In implementing the Fry Mode in response to an increase in heat setting, either from OFF or from a previously selected heat setting, the heating element is operated at a transient power level determined by the electronic control means as a function of the difference between the steady state temperature range and the sensed utensil temperature when the sensed utensil temperature is less than the steady state temperature range for the selected heat setting. The power level applied to the heating element exceeds the steady state power level for the selected heat setting by a number of power levels, which number of levels is a function of the difference between the sensed utensil temperature and the steady state temperature range for the selected heat setting. As this temperature difference approaches zero, the applied power level approaches the steady state level. By operating the heating element at relatively high power levels when the difference between the sensed temperature and the desired temperature range is large, the utensil temperature initially increases rapidly. By operating the heating element at power levels which decrease toward the steady state level as the sensed temperature increases toward the desired temperature range, the desired relatively rapid thermal response is achieved while avoiding the substantial temperature overshoots and undershoots which are typical of the so-called "bang-bang" or linear feedback approaches in which the power is either full on or full off, depending upon the error.

As briefly hereinbefore described, in the Fry Mode each heat setting has associated with it a steady state duty cycle or power level which is intended to maintain typically loaded cooking utensils within the corresponding steady state temperature range following the transient period during which the utensil is initially heated to its steady state level. When the sensed utensil temperature exceeds the steady state temperature range the heating element is de-energized. If the sensed utensil temperature decreases below the steady state temperature range, the power level applied to the heating element is adjusted upwardly as a function of the temperature difference just as hereinbefore described with reference to the transient heat-up period.

The Fry Mode also enables the user to select the WARM levels designated Wm(1) and Wm(2). In response to these selections, the heating element is energized just as in the Warm Operating Mode hereinafter described with reference to the general Boil Mode.

A.(2) General Boil Mode

The General Boil Mode is selected via mode switch 32. Within this General Boil Mode, the user is further able to select the Warm, Simmer and actual Boil Mode, the latter being further divided into Lo, Med and Hi modes.

A.(3) Warm Mode

The purpose of the Warm Mode is to enable the user to warm food quickly to a predetermined relative low temperature substantially less than the boiling point of water. This mode is particularly advantageous when warming milk, as the predetermined temperature is selected such that the milk may be warmed without risk of scalding, even if left unattended. Referring again to Table II, the Warm Mode has associated with it three heat settings, designated Wm(1), Wm(2) and Wm(3) corresponding to selection marks 54(a), 54(b) and 54(c) for control knob 22. Heat setting Wm(1) has maximum temperature limit of 120° F. Heat settings Wm(2) and Wm(3) have associated therewith steady state temperature ranges 121°-146° F. and 147-167° F., respectively. Selection of heat setting Wm(1) causes heating element 12 to be operated at power level 3 whenever the sensed utensil temperature is less than 121° F. and de-energized the sensed utensil temperature exceeds 121° F. For settings Wm(2) and Wm(3), heating element 12 is operated at power level 6 corresponding to a 22% duty cycle when the sensed utensil temperature is less than the minimum threshold temperature of 121° F. In order to bring the utensil temperature rapidly to its desired temperature, it has been empirically determined that for heating element 12 this is the maximum duty cycle which can be applied without risk of scorching food in the utensil. When the sensed utensil temperature is within the steady state range for settings Wm(2) and Wm(3), heating element 12 is operated at the steady state power levels 3 and 4, respectively. If the sensed utensil temperature rises above the upper threshold temperature for the selected setting, the heating element is de-energized until the sensed temperature cools to lower than the upper threshold temperature. Should the temperature fall below the desired range power level 6 is again implemented until the sensed temperature falls within the desired temperature range. The three heat settings in this mode enable the user to select the proper heat setting for the size of the food load being warmed.

A.(4) Simmer Mode

The Simmer Mode enables the user to heat food rapidly to a temperature closely approaching but not exceeding the boiling point of water (212° F.) and then to hold the temperature of the food at this level without boiling when left unattended.

There are three heat settings for the Simmer Mode designated in Table II as Sim(1), Sim(2) and Sim(3), which correspond to selection marks designated 56(a), (b) and (c) for control knob 22 (FIG. 2). The steady state temperature range for all three settings is 198° -220° F. This range for the sensed utensil temperature assures that the contents of the utensil will be near the boiling point of water (212° F.) but will not be hot enough to actually boil. It has been empirically determined that the sensed utensil temperature is typically on the order of 15° F. hotter than the contents of the utensil. This is believed due at least in part to the fact that the sensor senses the external surface of the utensil, which surface is in direct contact with the heating element. The external utensil surface temperature is higher than the contents of the utensil due in part to heat losses in the utensil itself. Selected temperature limits have been empirically determined to work satisfactorily for the heating element of the illustrative embodiment. These limits are illustrative only and not intended to be limiting. It is to be understood that for other heating elements or temperature sensing arrangements other temperature limits may provide better performance.

In order to rapidly bring the contents of the utensil to the desired simmer temperature for a variety of food load sizes and maintain that temperature efficiently, each of the three heat settings has a different steady state power level associated with it as shown in Table II. In order to rapidly reach the steady state temperature range with minimal overshoot, the electronic control means is operative in the Simmer Mode to operate the heating element at a predetermined relatively high power level when the sensed utensil temperature is less than a predetermined minimum simmer reference temperature. In the illustrative embodiment, the high power level is level 15 (100% duty cycle) and the threshold temperature is 121° F. For sensed utensil temperatures between the minimum reference temperature and a predetermined intermediate simmer reference temperature the heating element is operated at a predetermined intermediate power level. In the illustrative embodiment the intermediate reference temperature is 198° F. and the intermediate power level is power level 8 (31.5% duty cycle). For sensed utensil temperatures between the intermediate reference temperature and a predetermined maximum simmer reference temperature, the heating element is operated at the steady state power level associated with the selected heat setting. In the illustrative embodiment, the predetermined maximum simmer reference temperature is 220° F. The steady state power levels for Sim(1), Sim(2) and Sim(3) are 4, 5 and 6, respectively (12.5%, 16% and 22% duty cycle, respectively). The minimum, intermediate and maximum reference temperatures are selected to rapidly bring the temperature of the contents of the utensil to near its boiling point without boiling and to hold the controls near the boiling point without boiling.

After the sensed utensil temperature reaches the steady state temperature range, if the sensed temperature exceeds 220° F., the heating element is de-energized, i.e. power level 0 is applied. If the sensed utensil temperature drops below 198° F., power level 8 (31.5% duty cycle) is applied. When the sensed utensil temperature is within the 198° -220° F. range, the applied power level is that associated with the selected heat setting, i.e. level 4, 5 or 6 (Table II). This enables the user to select a duty cycle which will sufficiently heat the contents of the utensil to provide the desired simmer rate for the size of the load being heated while being assured that the sensed utensil temperature will remain within a relatively narrow temperature band set sufficiently low to prevent boiling.

A. (5) Actual Boil Mode

The operating mode broadly referred to as the general Boil Mode includes in addition to the hereinbefore described Warm and Simmer Modes, three actual boil modes, that is three modes for controlling the actual boiling of water loads contained in utensils placed on heating element 12. These modes are designated Lo, Med, and Hi Modes. Each of these modes has three heat settings corresponding to selection marks 58(a)-(c), 60(a)-(c) and 62(a)-(c) for Lo, Med and Hi Boil Modes, respectively for control knob 22 (FIG. 2); hence, in the illustrative embodiment the user can select from a total of 9 heat settings for boiling water loads on heating element 12. The steady state power level for each heat setting is shown in Table II.

These nine heat settings enable the user to select the steady state power level or duty cycle which will provide the desired boiling rate from low to high for particular utensil size and volume of water being heated.

Automatic boiling rate control is complicated by the isothermal nature of boiling water. Once the temperature of the water reaches its boiling point (nominally 212° F.) it goes no higher. Increasing the output power of the surface unit above that necessary to bring the water temperature to the boiling point will increase the temperature of the utensil and increase the boiling rate, but will not appreciably increase the water temperature. It has been observed that the boiling or evaporation rate of the water is quite sensitive to changes in utensil temperature. For a given utensil, relatively small changes in utensil temperature can cause relatively large changes in the boiling rate. In addition, the utensil temperature associated with a particular boiling rate for one utensil configuration may be substantially different from that needed to maintain the same boiling rate in a different utensil. Consequently, attempts to control boiling rate in response to temperature measurements generally provide unsatisfactory results.

In accordance with one aspect of the present invention, this difficulty is overcome by operating the heating element at full power until the sensed utensil temperature reaches a predetermined threshold temperature which temperature is reached before the contents of the utensil begins to boil. Thereafter the heating element is operated at a predetermined power level corresponding to the selected heat setting. This in effect provides closed loop temperature control when bringing the contents of the utensil close to the boiling temperature to assure that the boiling point is rapidly reached, and provides open loop control of boiling rate for temperature above the boiling point to enable the user to vary the power level to achieve the desired boiling rate for the particular utensil and water load.

Rapid thermal response in the boil mode, which is particularly advantageous when the surface unit is initially at room temperature, is achieved by operating the heating element at full power (power level 15, 100% duty cycle) when the sensed utensil temperature is less than a predetermined reference temperature. Because of the isothermal nature of the boiling water, thermal overshoot is of little concern. Hence a relatively high minimum boil reference temperature may be selected which allows the water in the utensil to closely approach its boiling point (212° F.) even though the element is being overdriven at full power, thereby enhancing the speed of response. However, the sensed temperature of the water and hence the sensed utensil temperature will not increase appreciably once the water load begins boiling. If boiling begins before the reference temperature is reached, the reference temperature will likely not be exceeded in which case maximum power would be applied to the heating element continuously, resulting in a highly energy inefficient operation. Therefore, it is critical that the minimum boil reference temperature be set sufficiently low to insure that it is sensed before boiling actually begins.

It has been empirically determined that a sensed utensil temperature of 220° F. brings the utensil contents sufficiently close to the boiling point to insure that the thermal inertia of the heating element will be sufficient to bring the contents of the utensil to its boiling point and yet can be reliably sensed before the contents of the utensil begins to boil by the sensing arrangement of the illustrative embodiment. Hence, in the illustrative embodiment the minimum boil reference temperature is selected to be 220° F. When the sensed utensil temperature is less than 220° F., power level 15 is applied. When the sensed utensil temperature exceeds 220° F., the steady state power level associated with the selected heat setting is applied (see Table II). This enables the user to vary the boiling rate and to achieve the desired boiling rate for various size water loads without employing a power level substantially higher than necessary thereby enhancing the energy efficiency of the appliance.

B. Microprocessor Implementation

B.(1) Control Circuit

Figure 5:
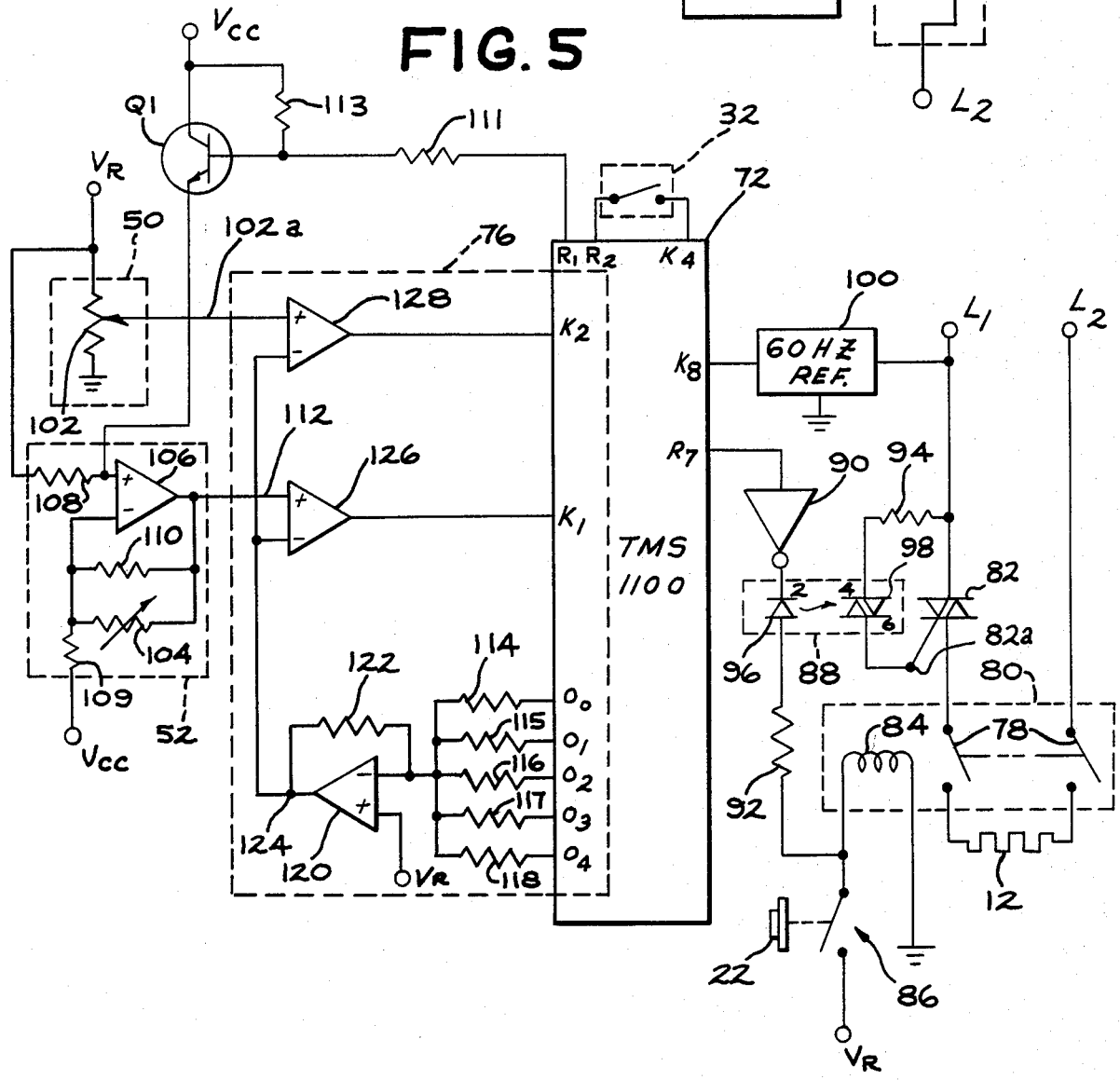
FIG. 5 is a simplified schematic diagram of a control circuit illustratively embodying the power control arrangement of the present invention as embodied in the range of FIG. 1.

A control circuit illustratively embodying a control arrangement implementing the hereinbefore described operating modes in accordance with the present invention is represented in simplified schematic form in FIG. 5. Electronic control means 46 of FIG. 4 is provided in the form of a microprocessor 72. Microprocessor 72 makes power control decisions for heating element 12 in response to input signals from input selection means comprising mode selection switch 32 and heat setting input means 50, and from temperature sensing means 52, in accordance with the control program stored in the Read Only Memory (ROM) of microprocessor to be hereinafter described.

Heating element 12 is connected across power lines L1 and L2 via normally open contacts 78 of ON/OFF relay 80 and power control triac 82. Power lines L1 and L2 are adapted for coupling to an external 60 Hz AC 120 or 240 volt typical domestic power supply. Coil 84 of ON/OFF relay 80 is serially connected between DC reference voltage supply $V_R$ and system ground via ON/OFF switch 86. Switch 86 is mechanically coupled in conventional manner schematically illustrated in phantom to control knob 22 (FIG. 2) such that switch 86 is in its open position when control knob 22 is in its OFF position. Movement of control knob 22 from its OFF position places switch 86 in its closed position energizing coil 84 which in turn closes contacts 78, thereby enabling power control triac 82 to control energization of element 12.

Microprocessor 72 controls the switching of power control triac 82 by trigger signals provided at output port R7. The signal at R7 is coupled to pin 2 of opto-isolator device 88 via inverting buffer amplifier 90. Pin 1 of opto-isolator 88 is coupled to dc reference voltage supply via current limiting resistor 92. The output return pin 4 of opto-isolator 88 is coupled to power line L2 via current limiting resistor 94. Pin 6 is coupled to the gate terminal 82a of power control triac 82 which is connected in series with heating element 12. A trigger signal at R7 is inverted by amplifier 90, thereby forward biasing light emitting diode 96 of opto-isolator 88, which in turn switches the bipolar switch portion 98 of opto-isolator 88 into conduction, thereby applying a gate signal to power control triac 82 switching it into conduction.

A 60 Hz pulse train is generated by conventional zero crossing detector circuit 100 coupled between L1 and input port K8 of microprocessor to facilitate synchronization of triac triggering and other control system operations with zero crossings of the 60 Hz AC power signal applied across L1 and L2.

User inputs are provided to microprocessor 72 via Boil/Fry Mode selection switch means 32 and heat setting selection means 50 comprising input potentiometer 102. Mode selection switch 32 is directly coupled between output port R2 and input port K4 of microprocessor 72. The open and closed states of switch 32 signify selection of the general Boil Mode and Fry Mode, respectively. Microprocessor 72 determines the state of switch 32 by periodically generating a logical high signal at R2 and monitoring the input signal at K4.

Input potentiometer 102 is coupled between regulated 10 volt dc reference voltage supply $V_R$ and system ground. Wiper arm 102a of potentiometer 102 is positioned by user rotation of control knob 22 (FIG. 2). The voltage between wiper arm 102a and system ground is an analog signal representing the selected heat setting.

Temperature sensing means 52 comprises thermistor device 104 connected between the output and inverting input of operational amplifier 106. The non-inverting input of amplifier 106 is coupled to a regulated dc reference voltage supply $V_R$ via resistor 108. The inverting input of amplifier 106 is coupled to regulated dc supply Vcc via resistor 109. A linearizing resistor 110 is connected in parallel with thermistor 104. The value of resistor 110 is selected such that the equivalent resistance of the parallel combination of resistor 110 and thermistor 104 varies approximately linearly with the temperature sensed by thermistor 104. Resistor 109 couples regulated supply voltage Vcc to the inverting input of amplifier 106. By this arrangement the output voltage of amplifier 106 on line 112 is an approximately linear function of the temperature sensed by thermistor 104. The output voltage at line 112 has been found to represent the actual temperature of the outer surface of the utensil in contact with the sensor to an accuracy on the order of $\pm 2$-$3°$ F.

In order to prolong the life of thermistor 104, a disabling circuit comprising transistor Q1 and biasing resistors 111 and 113 is connected between output port R1 of microprocessor 72 and the non-inverting input of amplifier 106. Output port R1 is coupled to the base of transistor Q1 via resistor 111. Resistor 113 is connected between the collector and base of transistor Q1. The collector is also tied to supply voltage Vcc. The emitter of transistor Q1 is connected to the non-inverting input of amplifier 106. The function of this arrangement is to only pass current through thermistor 104 when temperature measurements are being made. To this end microprocessor 72 sets output R1 causing a positive voltage to be applied to the base of transistor Q1 via resistor 111. This switches transistor Q1 into conduction pulling the voltage at the inverting input of amplifier 106 to Vcc. This similarly pulls the output voltage of amplifier 106 to Vcc. As a result there is no voltage drop across thermistor 104 and hence no current flow therethrough. When a temperature measurement is to be made, R1 is reset, turning off transistor Q1, thereby effectively switching the disabling circuit out of the sensing circuit.

The analog heat setting and utensil temperature signals from potentiometer 102 and temperature sensing circuit 52, respectively, are converted to digital form for input to microprocessor 72 by A/D conversion circuitry 76. A/D circuit 76 utilizes a five-bit binary weighted ladder resistor network comprising resistors 114, 115, 116, 117 and 118, operational amplifier 120 and feedback resistor 122 coupled between output 124 of amplifier 120 and its inverting input. Resistors 114–118 couple output ports $0_0$–$0_4$, respectively, to the inverting input of amplifier 120. Analog voltages corresponding to coded outputs generated by microprocessor 72 at output ports $0_0$–$0_4$ are generated at output 124 of amplifier 120. This output voltage is coupled to the inverting inputs of operational amplifiers 126 and 128. The non-inverting inputs of amplifiers 126 and 128 are connected to the output line 112 of temperature circuit 52 and wiper arm 102a of potentiometer 102, respectively. The outputs of amplifiers 126 and 128 are coupled to input ports K1 and K2, respectively, of microprocessor 72.

Microprocessor 72 samples the temperature output signal by generating a sequence of five-bit signals at output ports $0_0$–$0_4$, each signal representing a threshold temperature. Each five-bit signal is converted to an analog voltage level at output 124 of amplifier 120. Microprocessor 72 internally monitors the state of input port K1. The heat setting input is similarly obtained by monitoring input port K2 as a sequence of digital signals appears at $0_0$–$0_4$, representing the 16 available heat settings. The codes utilized for temperature and heat setting determination will be described in detail hereinafter in conjunction with the description of the control program and more specifically the User Input Scan and the Temp Scan routines for the control program.

The following component values are believed suitable for use in the circuit of FIG. 5. These values are exemplary only, and are not intended to limit the scope of the claimed invention.

| Fixed Resistors (Ω) | | | | Transistor Q1 | |
|---|---|---|---|---|---|
| 92 | 220 | 114 | 162K | 2H2222 | |
| 94 | 220 | 115 | 82K | Opto-Isolator | |
| 108 | 47K | 116 | 40K | 88 | MDC 3020 Integrated Circuit |
| 109 | 925 | 117 | 20K | Operational Amplifiers | |
| 110 | 1.69K | 118 | 10K | 90 | ULN 2004A Integrated Circuit |
| 111 | 4.7K | 122 | 9.3K | 106 | National Semiconductor |
| 113 | 10K | | | 120 | LM 308 |
| Variable Resistor (Ω) | | | | 126 | Integrated Circuit |
| 102 | 50K | | | 128 | |
| Thermistor (Ω) | | | | Microprocessor | |
| 104 | 100K | | | 72 | Texas Instruments TMS 1100 |
| | | | | Triac | |
| | | | | 82 | General Electric SC 147 |
| | | | | Surface Unit | |
| | | | | 12 | General Electric WB 30 × 218 |

B.(2) Control Program

Microprocessor 72 is customized to perform control functions in accordance with this invention by permanently configuring the Read Only Memory (ROM) of microprocessor 72 to implement predetermined control instructions. FIGS. 6 through 13B are flow diagrams which illustrate the control routines incorporated in the control program of microprocessor 72 to perform the control functions in accordance with the present invention. From these diagrams one of ordinary skill in the programming art can prepare a set of instructions for permanent storage in the ROM of microprocessor 72. For the sake of simplicity and brevity, the control routines to follow will be described with respect to the implementation of the control algorithms of the present invention. It should be understood that in addition to the control functions of the present control arrangement herein described there may be other control functions to be performed in conjunction with other operating characteristics of the appliance and in the control of the other three heating elements. Instructions for carrying out the routines described in the diagrams may be interleaved with instructions and routines for other control functions which are not part of the present invention.

The control program consists of a sequence of routines illustrated in the flow diagrams. The control program is cycled through once each control interval, i.e. once each 133 milliseconds. It should be noted that the control circuit is continually energized while the appliance is plugged in so that the control program for heating element 12 is cycled through every 133 milliseconds even if the OFF setting is selected. Hence, a power control decision for heating element 12 is made every 133 milliseconds.

The control program for controlling energization of heating element 12 is logically separated into several control routines. The Input Scan routine scans mode select switch 32 and conducts the A/D conversion of the analog voltage signal from input potentiometer 102 to determine the user selected mode and heat settings. The Temp Scan routine conducts the A/D conversion of the analog voltage signal representing the sensed utensil temperature. The Filter and Timing routine performs a software filter function resulting in an output signal which is the filtered utensil temperature signal. This routine also controls periodic sampling of the filtered signal to minimize radiation effects on its accuracy. This periodic sample is employed in the appropriate one of the Warm, Simmer, Boil and Fry routines to determine the power level to be implemented as a function of the selected mode and heat setting and the sensed utensil temperature. The appropriate power level is input to the Power Compare routine which makes the power control decision and the Power Out routine then triggers power control triac 82 into conduction as appropriate thereby implementing the corresponding duty cycle for the desired power level. Each of the control program routines will be described in greater detail with reference to its flow diagram in the discussion to follow.

Figure 6:
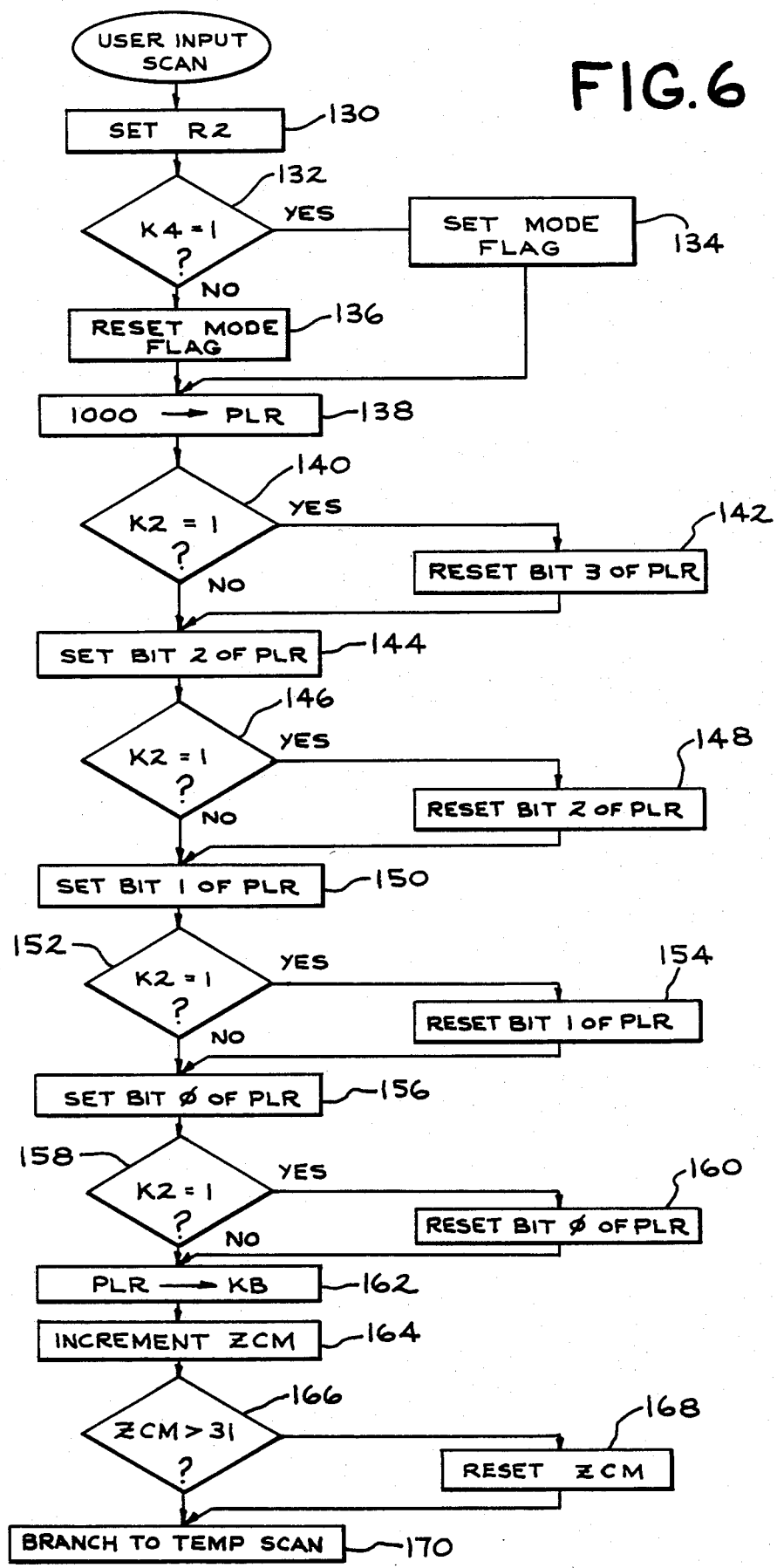
FIG. 6 is a flow diagram of the USER INPUT SCAN routine incorporated in the control program for the microprocessor in the circuit of FIG. 5.

USER INPUT SCAN Routine—FIG. 6

The function of this routine is to identify the mode selected by the user via mode select switch 32 and the heating setting selected by the user via control knob 22. First, the state of mode select switch 32 is determined by setting output R2 (Block 130). Inquiry 132 then scans input port K4 to determine whether switch 32 is open (K4=0) or closed (K4=1). If K4=1, signifying selection of the Fry Mode, a Mode Flag is set for future reference in a subsequent routine (Block 134). If K4=0, signifying selection of the Boil Mode, the Mode Flag is reset (Block 136).

Following determination of the selected mode, the analog output from potentiometer 102 is converted to a digital signal. It will be recalled that there are 16 possible heat settings, each represented by a corresponding digital signal. In this routine PLR is a 4 bit digital word which sets the reference voltage in the A/D conversion scheme via the resistor ladder network portion of A/D converter 76. PLR is varied in accordance with a successive approximation technique and the voltage generated at the output of operational amplifier 120 (FIG. 5) corresponding to each word is compared to the voltage signal at potentiometer arm 102a by comparator 128 to determine the power level selected.

TABLE III

| Digital Code | Corresponding Analog Voltage (volts) | Heat Setting Voltage Range (volts) | KB |
|---|---|---|---|
| 00000 | 10.00 | 10.0 | 0 |
| 00010 | 9.42 | 9.42–10.0 | 1 |

TABLE III-continued

| Digital Code | Corresponding Analog Voltage (volts) | Heat Setting Voltage Range (volts) | KB |
|---|---|---|---|
| 00100 | 8.84 | 8.84–9.42 | 2 |
| 00110 | 8.26 | 8.26–8.84 | 3 |
| 01000 | 7.67 | 7.67–8.26 | 4 |
| 01010 | 7.10 | 7.10–7.67 | 5 |
| 01100 | 6.56 | 6.56–7.10 | 6 |
| 01110 | 5.94 | 5.94–6.56 | 7 |
| 10000 | 5.35 | 5.35–5.94 | 8 |
| 10010 | 4.78 | 4.78–5.35 | 9 |
| 10100 | 4.19 | 4.19–4.78 | A |
| 10110 | 3.61 | 3.61–4.19 | B |
| 11000 | 3.02 | 3.02–3.61 | C |
| 11010 | 2.44 | 2.44–3.02 | D |
| 11100 | 1.86 | 1.86–2.44 | E |
| 11110 | 1.28 | 1.28–1.86 | F |

The digital code generated at outputs $O_0$–$O_4$ during the analog to digital conversion of the input voltage from wiper arm 102a is listed in Table III together with the corresponding analog voltage which is generated at output 124 of operational amplifier 120. The digital code in Table III is a five bit code, whereas the aforementioned PLR is a four bit word. This five bit code represents the code stored in the 0-register of microprocessor 72. The least significant bit of this code is derived from the status latch of microprocessor 72 and the next four bits are derived from the four bit PLR word. Since the least significant bit is always zero for the code in Table III, when performing the input scan, the status latch is always reset, i.e. zero, and the scan is performed by simply varying PLR and outputting the controls of PLR and the status latch to the O-register. The column headed KB in Table III shows the hexadecimal represention for the digital code assigned in this routine to variable KB. KB which represents the selected heat setting for analog potentiometer voltages in the voltage ranges shown. Wiper arm 102a is mechanically coupled to control knob 22 such that for each heat setting, the potentiometer output voltage lies near the middle of the corresponding voltages ranges shown in Table III.

Referring now to FIG. 6, the search starts in the middle by storing the code representing heat setting 8 at memory location designated PLR (1000→PLR) (Block 138). The four bits of the PLR word are individually referenced to hereinafter as 0, 1, 2, 3 with 0 designating the least significant of the four bits.

This state of the output ports $O_0$–$O_4$ (10000) results in a voltage of 5.35 volts at amplifier output 124 (FIG. 5). Inquiry 140 determines if the voltage representing the operator selected heat setting is higher (K2=1) signifying a lower selected heat setting or lower (K2=0) signifying a higher heat setting. Referring briefly back to FIG. 5, K2=1 if the voltage at wiper arm 102a of potentiometer 102 is greater than 5.35 volts signifying KB=8 or less. K2=0 signifies that the wiper arm voltage is less than 5.35 volts signifying KB greater than 8. If K2=1, PLR is set equal to 4 by resetting Bit 3 (Block 142) and setting Bit 2 (Block 144) (0100→PLR). If K2=0, PLR is set equal to 12 by simply setting Bit 2 (1100→PLR) (Block 144). Inquiry 146 determines if the selected heat setting (KB) is higher or lower than the corresponding to the present PLR. If lower (K2=1), PLR is decreased by 2 by resetting Bit 2 (Block 148) and setting Bit 1 (Block 150). If higher (K2=0), the PLR is increased by 2 by setting Bit 1 (Block 150).

Inquiry 152 determines whether the selected heat setting is higher or lower than the present. If lower (K2=1), PLR is decreased by 2 by resetting Bit 1 (Block 154) and setting Bit 0 (Block 156). If higher (K2=0), PLR is increased by 1 by setting Bit 1 (Block 156).

Inquiry 158 determines whether selected heat setting is higher or lower than the PLR. If lower (K2=1), PLR is reduced by one by resetting Bit 0 (Block 160) and then PLR is read into KB (Block 162). If higher (K2=0), PLR is read into KB (Block 162). Memory location KB now stores a digital signal representing the user selected power setting. The designator KB will hereinafter be used interchangeably with reference to the memory location and the signal itself. The specific meaning will be clear from the context.

Finally, the master counter (ZCM) which controls the duration of the control period is incremented (Block 164). It will be recalled that the control period is approximately 4.4 seconds corresponding to 32 control intervals. This routine is executed once every 133 milliseconds. Thus, the ZCM counter functions as a 32 count ring counter. The ZCM count is checked by Inquiry 166. If ZCM is greater than 31, ZCM is reset (Block 168). The ZCM count is utilized in the Power Out routine to be hereinafter described. The program now branches (Block 170) to the TAMP SCAN routine (FIG. 7A).

Figure 7A:
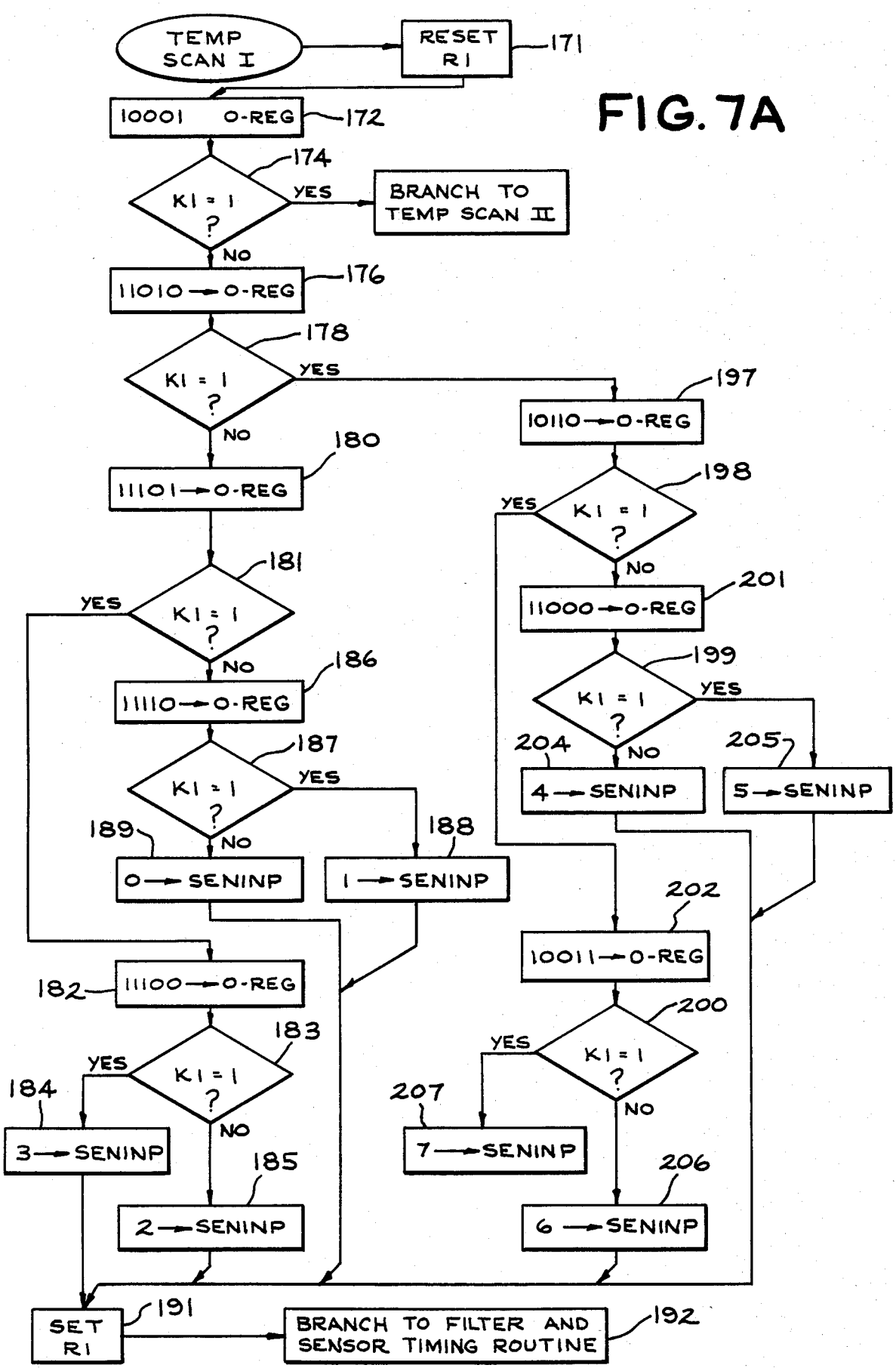
FIGS. 7A and 7B are flow diagrams of the TEMPERATURE SCAN routine incorporated in the control program for the microprocessor in the circuit of FIG. 5.
Figure 7B:
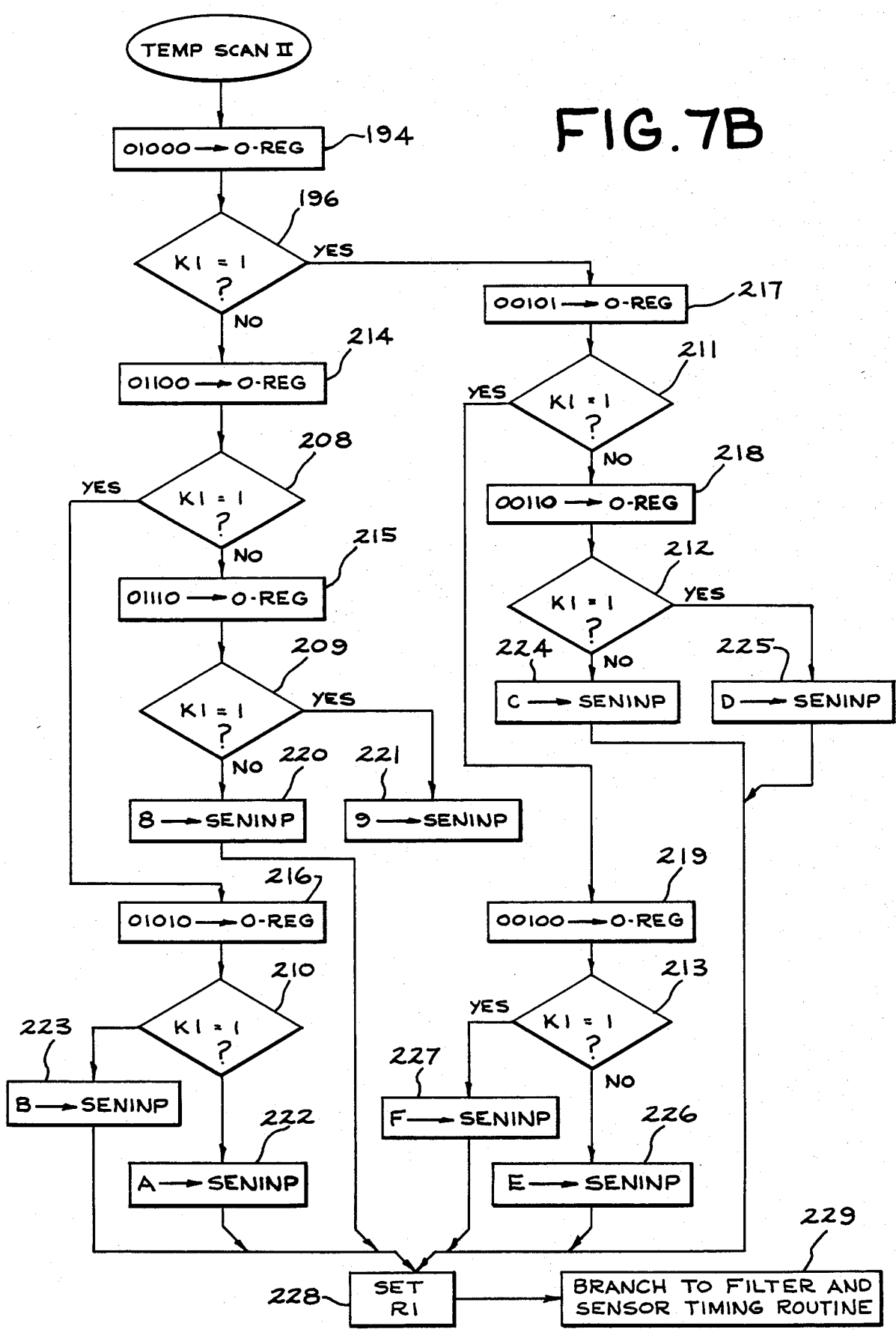

TEMP SCAN Routine—FIGS. 7A and 7B

The function of this routine is to convert the analog voltage at output 124 of amplifier 120 (FIG. 5) representing the sensed utensil temperature to a digital signal representative of the sensed utensil temperature. More specifically, this routine determines within which of the 15 predetermined temperature ranges the present sensed utensil temperature falls. A hexadecimal value is assigned to each of the 15 temperature ranges, as shown in Table IV. The relationship of the value assigned to the various temperature variables used in the routines hereinafter described including SENIN and SENOUT is defined by Table IV.

TABLE IV

| Hex Rep | Temp. Range °F. | Code | Analog Volts | Threshold T°F. |
|---|---|---|---|---|
| 0 | T<121 | 11110 | 1.28 | |
| 1 | 121≦T<147 | 11101 | 1.57 | 121 |
| 2 | 147≦T<167 | 11100 | 1.86 | 147 |
| 3 | 167≦T<198 | 11010 | 2.44 | 167 |
| 4 | 198≦T<220 | 11000 | 3.02 | 198 |
| 5 | 220≦T<241 | 10110 | 3.61 | 220 |
| 6 | 241≦T<269 | 10011 | 4.48 | 241 |
| 7 | 269≦T<287 | 10001 | 5.06 | 269 |
| 8 | 287≦T<316 | 01110 | 5.94 | 287 |
| 9 | 316≦T<336 | 01100 | 6.56 | 316 |
| A | 336≦T<360 | 01010 | 7.10 | 336 |
| B | 360≦T<387 | 01000 | 7.67 | 360 |
| C | 387≦T<423 | 00110 | 8.26 | 387 |
| D | 423≦T<444 | 00101 | 8.55 | 423 |
| E | 444≦T<472 | 00100 | 8.84 | 444 |
| F | 472≦T | 00010 | 9.42 | 472 |

Figure 8:
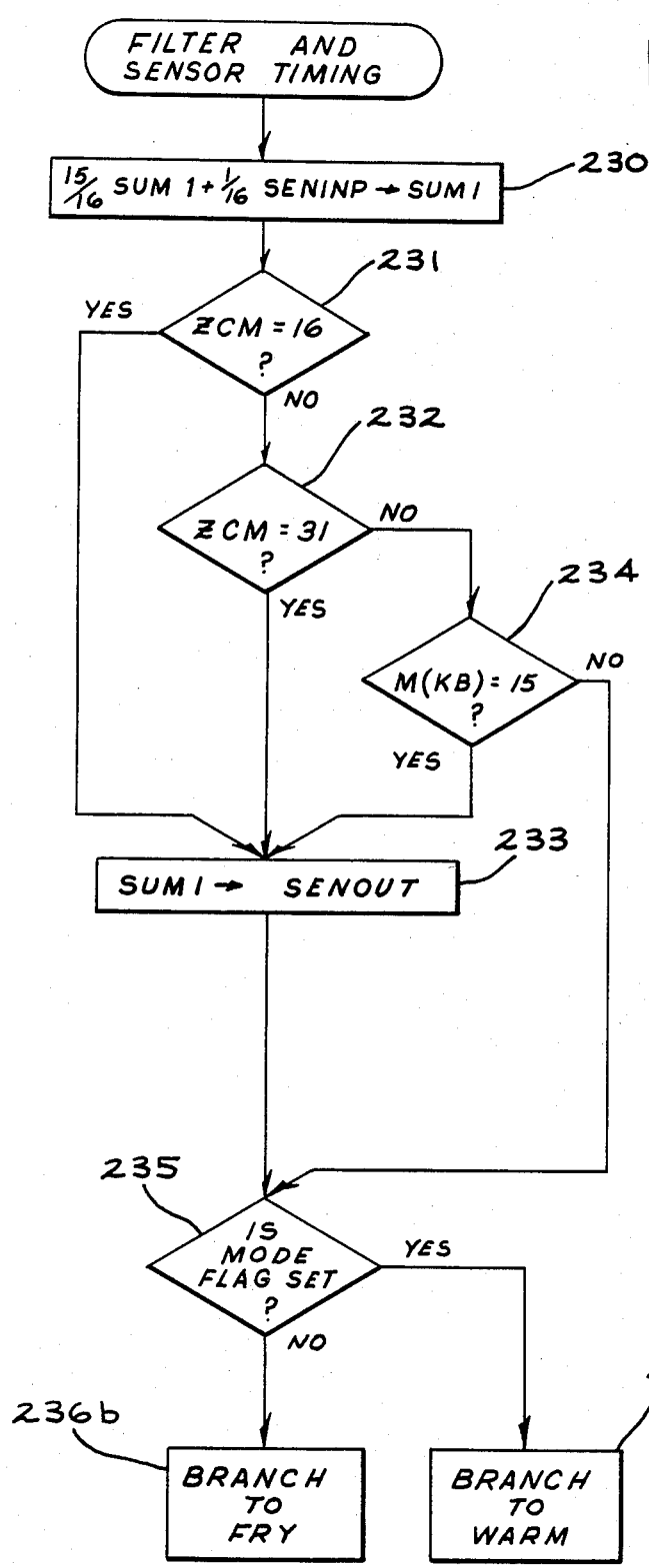
FIG. 8 is a flow diagram of the SENSOR FILTER and TIMING routine incorporated in the control program for the microprocessor in the circuit of FIG. 5.

Referring now to FIGS. 7A and 7B, R1 is reset (Block 171) to turn off transistor Q1 (FIG. 5) thereby enabling energization of thermistor 104. The search for the sensed utensil temperature range begins by setting the five bit 0 register (OREG) to 10001 corresponding to a reference temperature of 287° F. (Block 172). As in the User Input routine the five bits for the 0 register are derived from the 4 bit accumulator and the status latch. However, unlike the User Input Scan routine, in this routine the state of the status latch is also varied to generate the desired five bit codes. Inquiry 174 determines whether the sensed temperature is greater (K1=1) or less (K1=0) than 287° F. If less, the OREG code is changed to 11010 (Block 176) corresponding to a reference temperature of 198° F. Inquiry 178 determines if the sensed temperature is less than (K1=0) or greater than (K1=1) 198°. If less, the OREG code is changed to 11101 (Block 180) corresponding to a reference temperature of 147°; and Inquiry 181 determines if the sensed temperature is greater (K1=1) or less (K1=0) than 147°. If the sensed temperature is greater than 147°, OREG is changed to 11100 (Block 182) corresponding to a reference temperature of 167°. Inquiry 183 determines if the sensed temperature is greater (K1=1) or less (K1=0) than 167°. If the sensed temperature is greater than 167° (K1=1), sensor input variable SENINP is set equal to 3 (Block 184) which represents a sensed temperature greater than 167° F. and less than 198°. If the temperature is less than 167° ((K1=0) Inquiry 183), SENINP is set equal to 2 (Block 185), representing a sensed temperature greater than 147° and less than 167°. Referring back to Inquiry 181, if the sensed temperature is less than 147° F., OREG is changed to 11110 (Block 186) corresponding to a reference temperature of 121° F. Inquiry 187 determines if the sensed temperature is greater (K1=1) or less than (K1=0) 121° F. If greater, SENINP is set to 1 (Block 188) representing a temperature greater than 121° F. and less than 147° F. If less, SENINP is set to 0 (Block 189) representing a sensed temperature less than 121° F. Once the sensed temperature range is determined R1 is set (Block 191) turning off transistor Q1 thereby de-energizing thermistor 104 and the program branches (Block 192) to the FILTER and SENSOR TIMING routine (FIG. 8).

If at Inquiry 178 the sensed temperature is greater than 198° F. (K1=1), the 0-register is changed to 10110 (Block 197). Inquiries 198, 199 and 200 check for sensed temperatures greater than 241° F., 220° F. and 269° F., respectively. Blocks 201 and 202 appropriately set the 0-register code, and Blocks 204, 205, 206 and 207 assign the appropriate one of temperature range code 4, 5, 6 and 7, respectively, to SENINP.

Similarly, if Inquiry 174 determines K1 equals one, signifying a sensed utensil temperature greater than 287° F., the program branches to Block 194 (FIG. 7B) where the 0-register code is changed to 01000 representing 387°. Inquiry 196 determines if the sensed utensil temperature is greater (K1=1) or less than (K1=0) 387° F. Such comparisons are repeated by Inquiries 208–213 until the temperature is found to lie in one of the sixteen ranges. Blocks 214–219 appropriately set the 0-register code, and the appropriate one of Blocks 220–227 assigns the appropriate one of temperature range codes 8, 9, A, B, C, D, E, F, respectively, to variable SENINP. R1 is then set (Block 228) to disable thermistor 104 (FIG. 5) and the program then branches (Block 229) to the SENSOR FILTER and TIMING routine (FIG. 8).

While in the illustrative embodiment the USER SETTING SCAN routine is executed before the TEMP SCAN routine, these routines could just as well be executed in reverse order.

SENSOR FILTER and TIMING Routine—FIG. (8)

This routine performs the dual function of iteratively filtering the sensor output temperature signal SENINP and also controlling the timing of the updating of the temperature signal which is actually used in the control routines yet to be described. The filter function is implemented to minimize the impact of aberrant temperature measurement inputs from the temperature monitoring circuit; the timing function is implemented to minimize the effect of radiant energy from the heating element 12 impinging on thermistor 104 on the accuracy of the temperature measurements.

The iterative filter portion of this routine attaches relatively little weight to each individual input. Hence, isolated erroneous inputs are averaged out so as to have little effect on the accuracy of the cumulative average signal provided by the filter routine. Referring to FIG. 8, the filter function is performed by Block 230. It will be recalled that SENINP is the hexadecimal representation of the temperature range for the sensed utensil temperature determined in the hereinbefore described TEMP SCAN routine. One-sixteenth of the new SENINP input is added to 15/16 of the filter output variable designated SUM 1 from the previous pass through this routine. The resultant sum becomes the new value for the filter output variable SUM 1.

A new temperature input signal SENINP is processed by the filter portion of this routine to generate a new SUM 1, during each pass through the control routine, i.e. once every 133 milliseconds corresponding to 8 cycles of the 60 Hz power signal. However, to minimize the effects of radiant energy for heating element 12 on sensor 50, the sensed utensil temperature signal which is input to the power control portion of the control program is only updated during selected portions of the 4.4 second duty cycle control period.

It will be recalled that the ZCM counter operates as a 32 count ring counter, i.e. the counter counts from 0-31 and resets to 0. In the duty cycle control implemented in the POWER OUT routine to be hereinafter described, for duty cycles less than 100% the heating element is energized during the first part of the control period when the ZCM count is relatively low and de-energized while the ZCM count is relatively high. Since, except when operating at the 100% power level, the heating element is always de-energized for count 31, radiant energy effects on the sensor are minimum at ZCM count 31. Thus, radiation effects are minimized by updating SENOUT, the temperature signal utilized in implementation of the Power Control routine only at count 31. It is desirable, however, to have at least two updates of SENOUT during each 4.4 second control period, to limit oscillations between inputs. Hence, SENOUT is also updated at the midpoint of the control period, i.e. at count 16. There is potentially more error due to radiation effects for this measurement; however, the heating element is de-energized at this point for the twelve lower power levels. Hence, the effects of radiation even on this measurement are minimum except at the highest 4 power levels.

When the heating element is operated at 100% duty cycle, the radiation effects are the same at all counts; hence, for maximum accuracy SENOUT is updated during each execution of the control program, i.e. every 133 milliseconds.

Referring again to the flow diagram of FIG. 8, Inquiries 231 and 232 look for ZCM counts of 16 and 31, respectively. Upon the occurrence of either count, SENOUT is updated by the then current value of SUM 1 (Block 233). Otherwise, Inquiry 234 checks to determine if the power level presently being implemented is the 100% power level (M(KB)=15). If it is, SENOUT is updated by SUM 1 (Block 233) regardless of the count; if not, Block 233 is bypassed, and SENOUT is not updated during this pass. In this fashion for power levels lower than 15, SENOUT is updated only on counts 16 and 31, and when power level 15 is being implemented SENOUT is updated every count.

Figure 12:
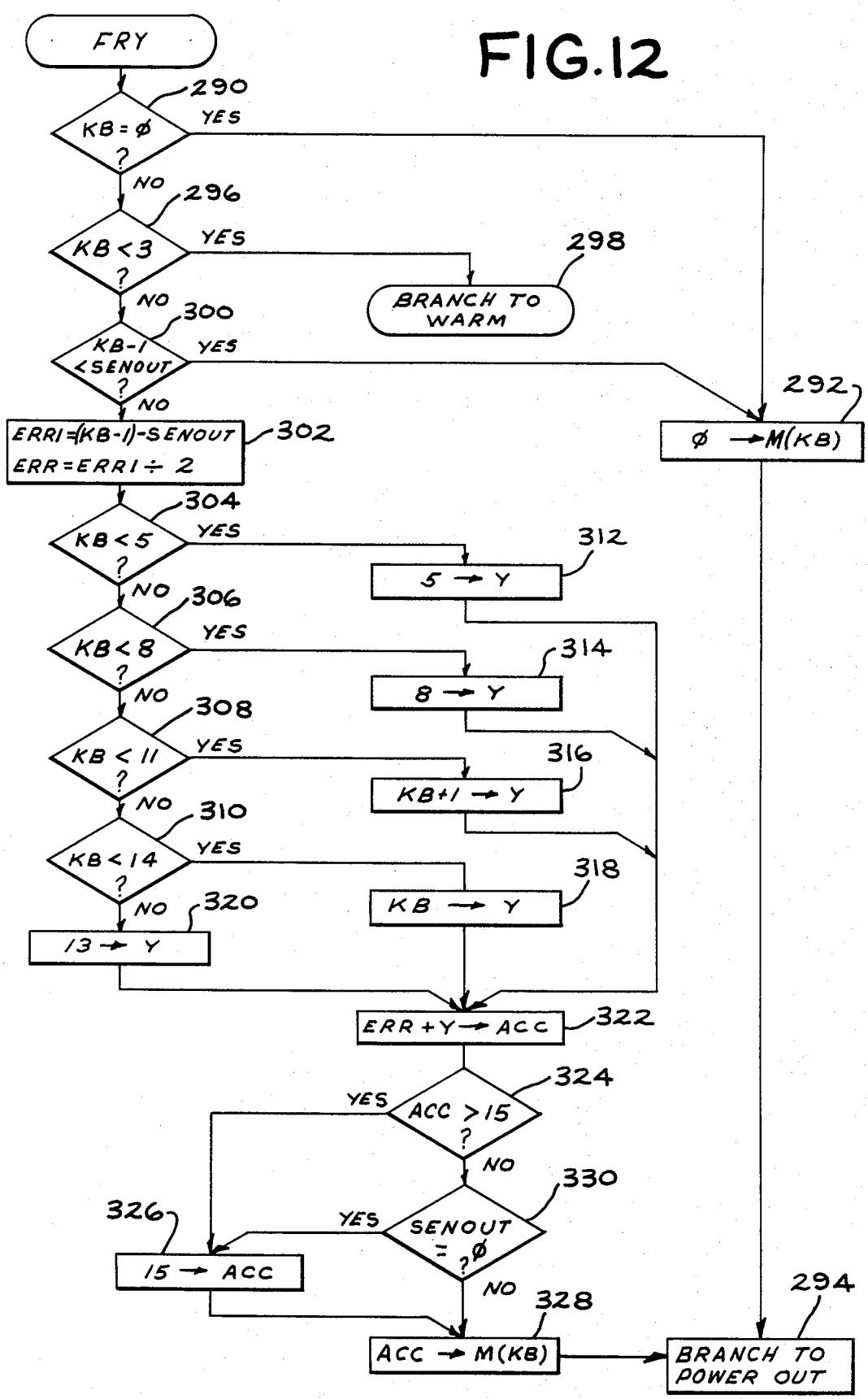
FIG. 12 is a flow diagram of the FRY routine incorporated in the control program of the microprocessor in the circuit of FIG. 5.

Inquiry 235 checks the state of the Mode Flag. If reset, signifying selection of the Boil Mode, the program branches (Block 236a) to the WARM Routine (FIG. 9); if set, the program branches (Block 236b) to the FRY Routine (FIG. 12).

Figure 9:
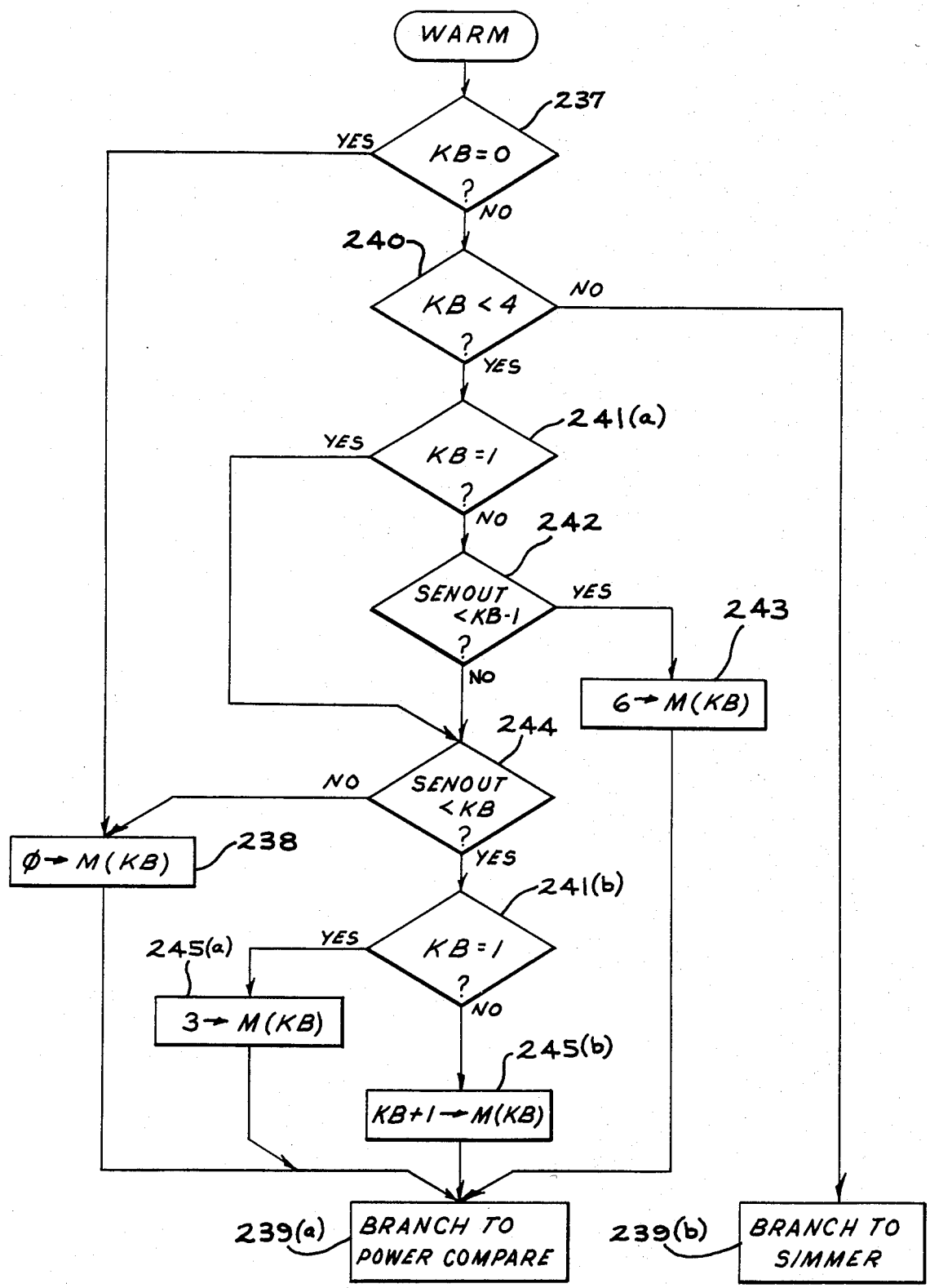
FIG. 9 is a flow diagram of the WARM routine incorporated in the control program of the microprocessor in the circuit of FIG. 5.

WARM Routine—FIG. 9

This routine is entered whenever the general Boil Mode is selected by mode switch 32. As will hereinafter be described this routine is also entered when either of the lower two heat settings for the Fry Mode are selected. The function of this routine is to implement the Warm Mode.

It will be recalled that in the Warm Mode except for the Wm(1) setting (KB=1) the heating element is operated at power level 6 when the sensed utensil temperature is less than the predetermined minimum warm reference temperature of 121° F. to rapidly bring the utensil to the desired temperature range; is operated at the steady state power level associated with the selected heat setting when the temperature is within the steady state temperature range for that heat setting; and is de-energized when the sensed utensil temperature exceeds the steady state range. In Wm(1) power level 3 is applied for sensed utensil temperatures less than 121° F. and power level 0 is applied for sensed utensil temperatures greater than 121° F. to minimize thermal overshoot at this low setting.

Figure 13A:
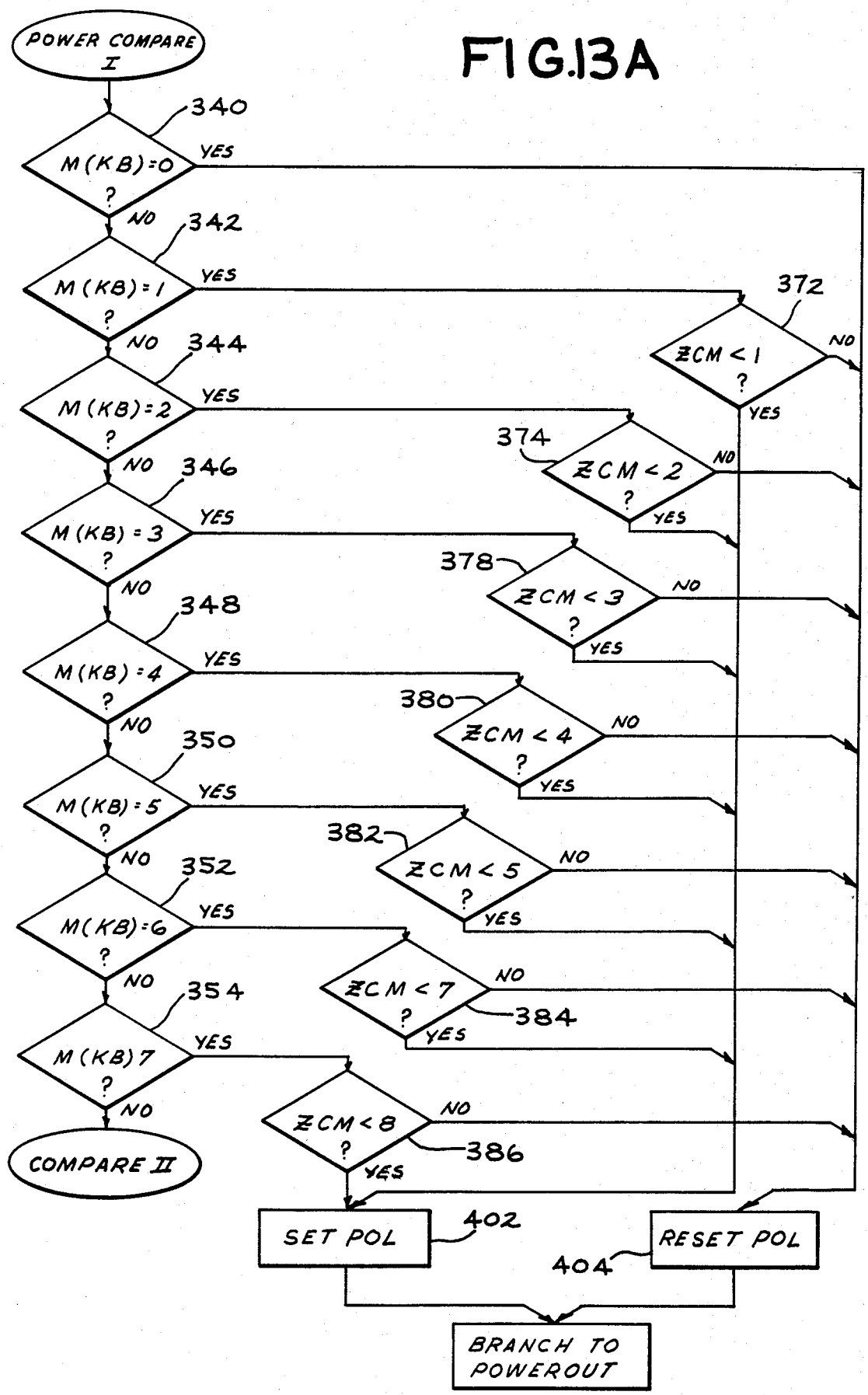
FIGS. 13A and 13B depict the flow diagram of the POWER COMPARE routine incorporated in the control program for the microprocessor in the circuit of FIG. 5.

Referring now to the flow diagram of FIG. 9, Inquiry 237 checks the user input for an OFF heat setting (KB=0). If yes, M(KB) is set to zero signifying implementation of the OFF or zero power level (Block 238) and the program branches (Block 239a) to the Power Compare routine (FIG. 13A). Otherwise, Inquiry 240 checks for a heat setting less than setting 4. As will become apparent in the description of the Power Compare routine, M(KB) is the variable utilized in that routine to implement the appropriate duty cycle. The duty cycle associated with each value of M(KB) is illustrated in Table I.

Figure 10:
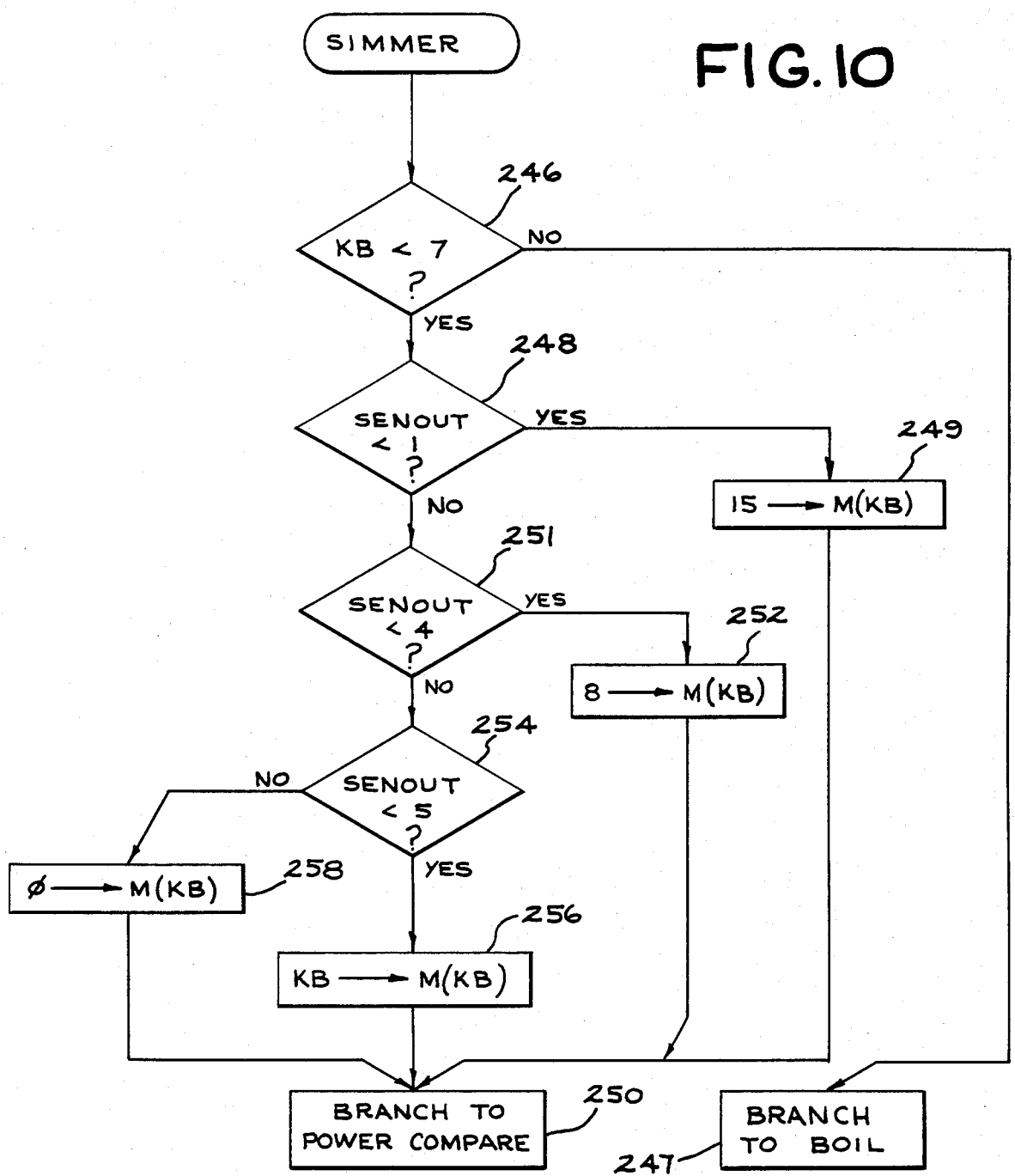
FIG. 10 is a flow diagram of the SIMMER routine incorporated in the control program of the microprocessor in the circuit of FIG. 5.

In the general Boil Mode, heat settings 1, 2 and 3 are the Warm Mode heat settings. If a heat setting other than 1, 2, or 3 is selected the program branches (Block 239b) to the Simmer routine (FIG. 10). If one of heat settings 1-3 has been selected, the program proceeds to Inquiry 241(a) which determines if heat setting Wm(1) (KB=1) is selected. If not, the program proceeds to Inquiry 242 which determines if the sensed utensil temperature variable SENOUT is less than KB−1, signifying a sensed utensil temperature less than 121° F. and 147° F. for Wm(2) and Wm(3) respectively. If SENOUT is less than KB−1, power level 6 is set by M(KB) to 6 (Block 243). The program then branches (Block 239a) to the Power Compare routine (FIG. 13A).

Referring again to Inquiry 242 if the sensed utensil temperature is not less than (KB−1) the program proceeds to Inquiry 244 which checks for the upper temperature limit.

In the event Inquiry 241(a) determines that Wm(1) has been selected (KB=1), then Inquiry 242 is bypassed and the program proceeds directly to Inquiry 244. For heat settings KB=1, KB=2 and KB=3, the maximum warm temperature limits are 121°, 147° and 167° F. corresponding to SENOUT=1, SENOUT=2, and SENOUT=3 respectively. If Inquiry 244 determines that the sensed utensil temperature is less than the maximum warm reference temperature for the selected heat setting (SENOUT<KB), Inquiry 241(*b*) checks for KB=1. If Wm(1) is selected (KB=1), power level 3 is set by setting M(KB) to 3 (Block 245(*a*)). If Wm(1) is not selected, the steady state power level associated with the heat setting is set by setting M(KB) to (KB+1) (Block 245(*b*)). This implements the steady state power levels 3, 3 and 4 for heat settings 1, 2 and 3, respectively, corresponding to duty cycles of 9%, 9% and 12.5%, respectively (See Tables I and II). If the sensed utensil temperature is not less than the maximum warm reference temperature, M(KB) is set to 0 (Block 238) corresponding to the zero or OFF power level. M(KB) having been set by the appropriate one of blocks 238, 243, 245(*a*) or 245(*b*), the program then branches (Block 239(*a*)) to the Power Compare routine (FIG. 13A).

SIMMER Routine—FIG. 10

The function of this routine is to implement the Simmer Mode. The user initiates the Simmer Mode by first selecting the General Boil Mode via mode select switch 32 and then by selecting one of heat settings 4-6 via control knob 22 (FIGS. 1 and 2). This routine is entered from the Warm routine (FIG. 9) whenever the General Boil Mode has been selected and the selected heat setting is greater than 3.

It will be recalled that the function of the Simmer Mode is to bring water loads rapidly to a temperature level close to the boiling point and holding that temperature without actually boiling. To this end, the heating element is energized at a relatively high predetermined power level when the sensed utensil temperature is less than a predetermined minimum simmer reference temperature. In the illustrative embodiment, the heating element is operated at power level 15 (100% duty cycle) as long as the sensed utensil temperature less than 121° F. For sensed utensil temperatures greater than the minimum simmer reference (121° F.) and less than an intermediate simmer reference temperature, the heating element is operated at an intermediate power level. In the illustrative embodiment, the intermediate reference temperature is 198° F. and the intermediate power level is power level 8 (31.5% duty cycle). For sensed utensil temperatures greater than the intermediate reference temperature (198° F.) and less than a maximum simmer reference temperature, the heating element is operated at the power level associated with the selected heating setting. In the illustrative embodiment, the maximum simmer reference temperature is 220° F. and the power levels are 4-6 for heat settings 4-6, respectively.

For sensed utensil temperatures greater than the maximum simmer reference temperature (220° F.) the heating element is de-energized, i.e. power level 0 is implemented.

Figure 11:
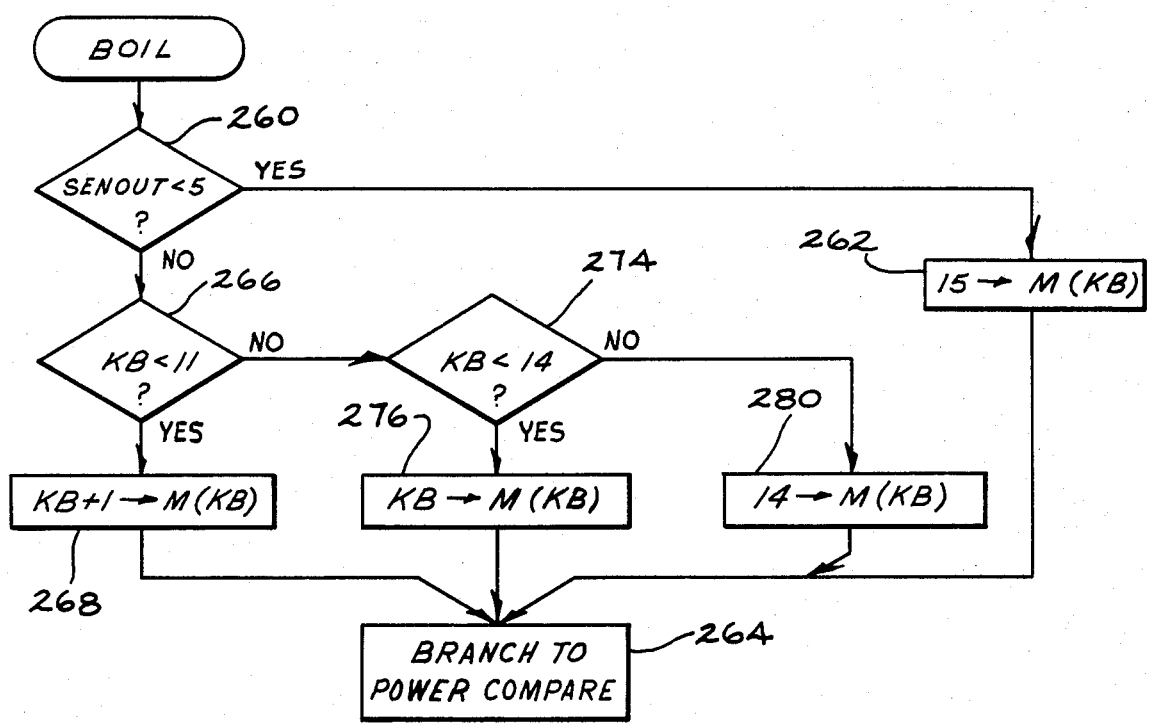
FIG. 11 is a flow diagram of the BOIL routine incorporated in the control program of the microprocessor in the circuit of FIG. 5.

Referring now to the flow diagram of FIG. 10, it will be recalled that the program enters this routine for heat settings greater than 3. Inquiry 246 looks for a heat setting selection less than 7. If KB is not less than 7, indicating a heat setting higher than 6, the program branches (Block 247) to the BOIL routine (FIG. 11). For heat settings 4-6, the program continues to Inquiry 248 which determines if the sensed utensil temperature is less than 121° F. (SENOUT<1). If yes, power level 15 is set by setting M(KB) to 15 (Block 249) and the program branches (Block 250) to the Power Compare routine (FIG. 13A). For sensed utensil temperatures greater than 121° F., Inquiry 251 determines if the sensed utensil temperature is less than 198° F. (SENOUT<4). If yes, power level 8 is set by setting M(KB) to 8 (Block 252) and the program branches (Block 250) to the Power Compare routine (FIG. 13A). If the sensed utensil temperature is greater than 198° F., Inquiry 254 determines if the sensed utensil temperature is less than 220° F. (SENOUT<5). If yes, the steady state power level for the selected heat setting is set by setting M(KB) to KB (Block 256) and the program branches (Block 250) to the Power Compare routine (FIG. 13A). If the sensed utensil temperature is greater than 220°, the zero power level is set by setting M(KB) to zero (Block 258) and the program branches (Block 250) to the Power Compare routine, FIG. 13A.

BOIL Routine—FIG. 11

This routine is entered from the Simmer routine (FIG. 10) when the Boil Mode is selected and the heat setting is one of the Lo, Med or Hi Boil settings. Its function is to implement the actual Boil Modes. In the actual Boil Modes, the water loads are brought to a boil with the boil rate being determined by the heat setting selected by the user. It will be recalled that in the actual Boil Mode the heating element is energized at a predetermined high power level until the sensed utensil temperature exceeds a predetermined minimum boil reference temperature. In the illustrative embodiment, the minimum reference temperature is 220° F. and the higher power level is power level 15 (100% duty cycle). When the sensed utensil temperature is greater than the minimum reference temperature, the heating element is energized at the steady state power level associated with the selected heat setting. The associated steady state power levels for settings 7-10 are 8-11, respectively. For heat settings 11-13 the associated steady state power levels are 11-13 respectively. For both heat settings 14 and 15 the associated steady state power level is 14.

Referring now to the flow diagram of FIG. 11, Inquiry 260 determines if the sensed utensil temperature is less than the minimum boil reference temperature of 220° F. (SENOUT<5). If it is, power level 15 is set by setting M(KB) to 15 (Block 262) and the program branches (Block 264) to the Power Compare routine (FIG. 13A). If the sensed utensil temperature is greater than 220°, Inquiry 266 detects the selection of any one of heat settings 7-10 (KB<11). For heat settings 7-10, the appropriate one of steady power levels 8-11, respectively, is set by setting M(KB) to KB+1 (Block 268). The program then branches (Block 264) to the Power Compare Routine (FIG. 13A). Inquiry 274 detects the selection of any one of heat settings 11-13. For these heat settings the appropriate one of power levels 11-13 respectively is set by setting M(KB) to KB (Block 276).

For heat settings 14-15, (KB not less than 14) M (KB) is set to 14 (Block 280) to set the steady state power level at 14 for each of these heat settings. The program then branches (Block 264) to the Power Compare routine (FIG. 13A).

FRY Routine—FIG. 12

The function of this routine is to implement the Fry Mode. This routine is entered when the user selects the Fry Mode via mode selection switch 32.

Inquiry 290 checks for an OFF heat setting (KB=0). If OFF is selected M(KB) is set to zero (Block 292) and the program branches (Block 294) to the Power Out routine, FIG. 13A. Otherwise, Inquiry 296 determines if heat settings Wm(1) or Wm(2) corresponding to KB equal to 1 and 2, respectively, has been selected (KB<3). If so, the program branches (Block 298) to the Warm routine, FIG. 9. For heat settings greater than 2, Inquiry 300 compares the sensed utensil temperature SENOUT with the maximum steady state reference temperature for the temperature range for the selected heat setting, which in the Fry Mode is (KB−1). For SENOUT>(KB−1), signifying that the sensed utensil temperature exceeds the desired range, Power Level zero is implemented (Block 292), and the program branches (Block 294) to the Power Out routine (FIG. 13A). For sensed utensil temperature less than the desired reference temperature range, an error signal (ERR) is computed (Block 302) as a function of the difference between the desired temperature range represented by (KB−1) and the sensed utensil temperature represented by SENOUT, by computing the difference between KB−1 and SENOUT and dividing the difference by two. Division by two to obtain ERR is done because use of the difference (ERR1) without division by two was empirically found to result in undesirable temperature overshoots under certain conditions. After computing the error signal, Inquiries 304–310 check the selected heat setting. A variable Y, corresponding to the steady state power level for the selected heat setting, is introduced in Blocks 312-320. If setting 3 or 4 is selected (KB<5) variable Y representing the steady state power level for the selected heat setting, is set to 5 (Block 312). If setting 5, 6 or 7 is selected (KB<8), variable Y is set to 8 (Block 314); if setting 8, 9 or 10 is selected (KB<11), Y is set to 9, 10 or 11, respectively, (Block 316); if setting 11, 12 or 13 is selected (KB<14), Y is set to 11, 12 or 13, respectively, (Block 318) and, finally, if setting 14 or 15 is selected, Y is set to 13 (Block 320). The error signal (ERR) is summed with steady state power level variable Y (Block 322) to generate a signal representing the power level to be applied, designated (ACC). Inquiry 324 and Block 326 limit the maximum value for ACC to 15 in the event the sum of ERR+Y is greater than 15. The value of power level variable ACC is then stored in M(KB) to implement the appropriate power level in the Power Out routine and the program branches (Block 294) to the Power Out routine (FIG. 13A).

To further speed the temperature response of the system in the Fry Mode, power level 15 is implemented when the sensed utensil temperature is less than 121° F. This is implemented by Inquiry 330 which checks the sensed utensil temperature. If the sensed utensil temperature is less than 121° F. (SENOUT=0), ACC is set to 15 (Block 326), resulting in M(KB) being set to 15 (Block 328), and the program then branches (Block 294) to the Power Compare routine, FIG. 13A.

Figure 13B:
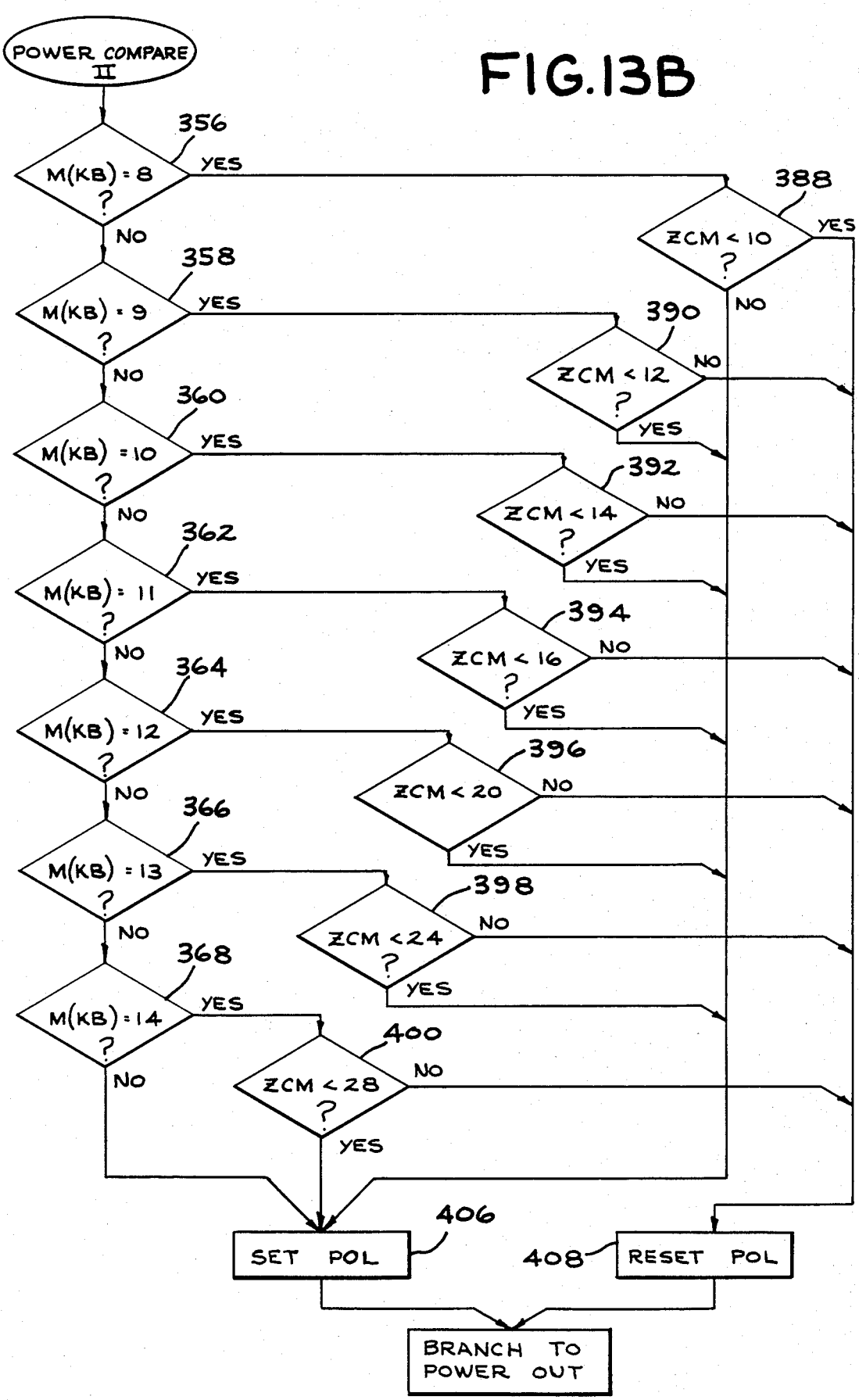

POWER COMPARE Routine—FIGS. 13A and 13B

The function of the Power Compare routine is to determine, based upon the power level designated by M(KB), whether or not the power control triac should be triggered into conduction for the next eight cycle control intervals.

It will be recalled that in the illustrative embodiment there are 16 possible power levels including OFF. The % duty cycle for each power level corresponds to the ratio of conductive control intervals to 32, the number of control intervals in the control period. The ZCM counter as hereinbefore described functions as a 32 count ring counter, which is incremented once for each pass through the control program. The power control decision is made by comparing the ZCM count with a reference count associated with the signified power level M(KB). The reference count for each power level represents the number of conductive control intervals per control period corresponding to the desired duty cycle. When the ZCM count is less than the reference, a Power Out Latch (POL) is set, signifying that switching power control triac 106 is to be switched into conduction; otherwise, POL is reset, signifying that power control triac 106 non-conductive.

Referring to FIGS. 13A and B, Inquiries 340–368 determine the value of M(KB). The appropriate one of Inquiries 372–400 corresponding to the identified M(KB) performs the comparison of ZCM to the associated reference count. If ZCM is less than the reference, the Power Out Latch is set by the appropriate one of Blocks 402 and 406, signifying that the heating element 12 is to be energized during the next control interval. Otherwise, the Power Out Latch is reset by the appropriate one of Blocks 404 and 408, signifying that heating element 12 is to be de-energized during the next control interval.

Figure 14:
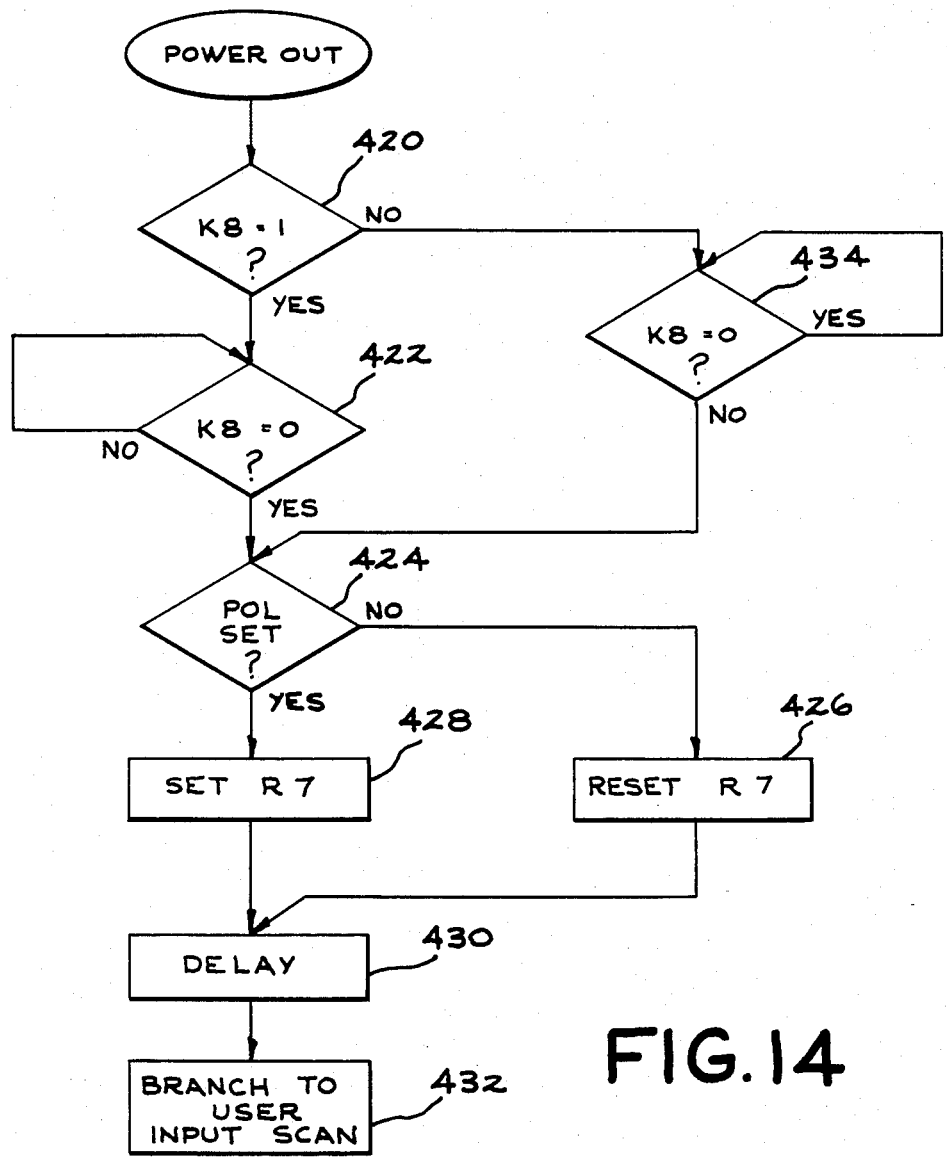
FIG. 14 is a flow diagram of the POWER OUT routine incorporated in the control program of the microprocessor in the circuit of FIG. 5.

Having made the power control decision, the program branches to the Power Out Routine, FIG. 14.

POWER OUT Routine—FIG. 14

The function of this routine is to await the next zero crossing of the 60 Hz AC power signal applied to the heating element 12 to synchronize firing of power control triac 82 (FIG. 5) with zero-crossings of the power signal.

Input port K8 receives zero crossing pulses from zero crossing detector circuit 100 (FIG. 5). Positive half-cycles are represented by K8=1 and negative half-cycles by K8=0. Inquiry 420 determines the polarity of the present power signal half-cycle. If the signal is presently in a positive half-cycle, (K8=1), Inquiry 422 waits for the beginning of the next negative half-cycle, (K8=0). Upon detection of K8=0, the program proceeds to Inquiry 424. If the answer to Inquiry 420 is NO (K8=0), Inquiry 434 waits for the beginning of the next positive half-cycle (K8=1), then proceeds to Inquiry 424. Inquiry 424 checks the state of the Power Out Latch (POL). If POL is reset, signifying that heating element 12 is not to be energized during the next control interval, R7 is reset (Block 426); if POL is set, signifying heating element 12 is to be energized, R7 is set (Block 248); the program delays (Block 430) and then returns (Block 432) to the User Input Scan Routine (FIG. 6) to repeat the control program for the next control interval.

In the illustrative embodiment the control program is executed in less than one-half cycle. Thus, it is necessary to delay the program for 15 half-cycles before repeating the User Input Scan Routine. In the hereinbefore described program this is done by simply delaying the program for 15 transitions of the input signal at K8. However, it is to be understood that microprocessor could be programmed to perform additional functions such as, for example, controlling the energization of the other three surface units during the time period between executions of the control program for heating unit 12. The other surface units could be similarly equipped with a temperature sensor and controlled by a control program similar to that for element 12. Alternatively, the elements could be controlled in conventional open loop fashion.

In the illustrative embodiment, all of the operating modes are included in the control program to provide a highly versatile automatic control surface unit. It is to be understood, however, that the Fry Mode and generalized Boil Mode are implemented independently. Hence, an automatic surface unit control could be provided which implements only one of the Fry, Warm, Simmer and Actual Boil Modes, or which could provide some combination of these modes less than the full combination of the illustrative embodiment, such as for example only the Warm, Simmer and Actual Boil Modes.

While in accordance with the Patent Statutes, a specific embodiment of the present invention has been illustrated and described herein, it is realized that numerous modifications and changes will occur to those skilled in the art. For example, while the surface units of the illustrative embodiment herein described comprise conventional resistive heating elements, the power control arrangement of the present invention can be readily adapted to surface units of other types, such as induction heating units and infrared heating units as well. It is therefore to be understood that the appended claims are intended to cover all such modifications and changes as fall within the true spirit and scope of the invention.

What is claimed is:

1. A surface unit power control arrangement for a cooking appliance comprising:
   at least one surface unit for supporting and heating a cooking utensil placed thereon and adapted for energization by an external power supply;
   temperature sensing means for sensing the temperature of a utensil supported on said surface unit;
   user operable input selector means enabling a user to select a Fry mode, and to select for said mode one of a plurality of different heat settings; each heat setting having associated with it a predetermined steady state surface unit power level and a predetermined steady state temperature range;
   electronic control means responsive to said temperature sensing means and said input means for controlling energization of said surface unit in accordance with the sensed utensil temperature and selected heat setting, said control means being operative in said Fry mode to generate an error signal which is a function of the difference between said sensed temperature and said steady state temperature range, and wherein said control means operates said surface unit at an applied power level which exceeds the steady state power level for the selected heat setting by a number of power levels determined as a function of said error signal, the applied power level approaching said steady state power level for the selected heat setting as said error signal approaches zero, whereby the utensil is rapidly brought to the selected temperature range with minimal overshoot.

2. A surface unit power control arrangement in accordance with claim 1 wherein said electronic control means includes means for generating a first digital signal representing the temperature range associated with the selected mode and heat setting; means for generating a second digital signal representing the steady state power level associated with the selected mode and heat setting; means for generating a third digital signal representing the sensed utensil temperature, and wherein said error signal is proportional to the difference between said first digital signal and said third digital signal, said control means including means for generating a digital power control signal which in said Frying mode is the sum of said second digital signal and said error signal, said control means being operative to operate said surface unit at an applied power level corresponding to the power level represented by said power control signal.

3. A surface unit power control arrangement for a cooking appliance comprising:
   at least one surface unit for supporting and heating a cooking utensil placed thereon and adapted for energization by an external power supply;
   temperature sensing means for sensing the temperature of a utensil supported on said surface unit;
   user operable input selector means enabling a user to select a Boil mode, and to select for said mode one of a plurality of different heat settings; each heat setting having associated with it a predetermined steady state surface unit power level and a predetermined steady state temperature range;
   electronic control means responsive to said temperature sensing means and said input means for controlling energization of said surface unit in accordance with the sensed utensil temperature and selected heat setting, said control means being operative in said Boil mode to operate said surface unit at a predetermined relatively high power level when the sensed utensil temperature is less than a predetermined minimum boil reference temperature, and to operate said surface unit at a power level corresponding to the selected heat setting when the sensed utensil temperature is greater than said minimum boil reference temperature.

4. A surface unit power control arrangement in accordance with claim 3 wherein said electronic control means includes means for generating a first digital signal representing the temperature range associated with the selected mode and heat setting; means for generating a second digital signal representing the steady state power level associated with the selected mode and heat setting; means for generating a third digital signal representing the sensed utensil temperature and means for comparing said third digital signal to a digital reference signal representing a predetermined boil reference temperature and means for comparing said third digital signal with said first digital signal, said control means further including means for generating a digital power control signal which in said Boil mode represents a predetermined relatively high power level when said third digital signal is less than said digital reference signal, said power control signal representing said steady state power level when said third signal is greater than said reference signal and less than said first digital signal said control means being operative to operate said surface unit at an applied power level corresponding to the power level represented by said power control signal.

5. A surface unit power control arrangement in accordance with claim 3 wherein said user operable input enables the user to select a Simmer mode, and wherein said control means is operative in said Simmer mode to operate said surface unit at a predetermined relatively high power level for sensed utensil temperatures less then a predetermined minimum simmer reference temperature, at a predetermined intermediate power level lower than said first power level when said temperature is between the said minimum simmer reference temperature and a predetermined intermediate simmer reference temperature, at the steady state power level associated with the selected heat setting for sensed utensil temperatures between said intermediate simmer reference temperature and a predetermined maximum simmer reference temperature, and to de-energize said surface unit when said sensed temperature exceeds said maximum simmer reference temperature, said minimum, intermediate and maximum simmer reference temperatures being selected to rapidly bring the temperature of the contents of the utensil to near its boiling temperature without boiling and to hold the contents near the boiling point without boiling.

6. A surface unit power control arrangement in accordance with claim 5 wherein said control means includes means for generating a first digital control signal representing the steady state power level for the selected heat setting; means for generating a second digital control signal representing the sensed utensil temperature; means for comparing said second digital control signal with a predetermined minimum reference signal representing said minimum simmer reference temperature, and with a predetermined intermediate reference signal representing said intermediate simmer reference temperature, and with a predetermined maximum reference signal representing said maximum simmer reference temperature; and means for generating a digital power control signal, said control signal representing, in said Simmer mode, said predetermined relatively high power level when said second signal is less than said minimum reference signal, and representing said predetermined intermediate power level when said second digital is greater than said minimum reference signal and less than said intermediate reference signal, and representing said steady state power level when said second signal is greater than said intermediate reference signal and less than said maximum reference signal, and representing an OFF power level when said second signal is greater than said maximum reference signal, said control means being operative to operate said surface unit at an applied power level corresponding to the power level represented by said power control signal.

7. A surface unit power control arrangement for a cooking appliance comprising:
at least one surface unit adapted for energization by an external power supply, said surface unit being constructed and arranged to support a cooking utensil thereon while heating the contents thereof;
temperature sensing means for sensing the temperature of a utensil supported on said surface unit;
user operable input selection means enabling a user to select one of a plurality of cooking modes including a Boil mode and a Fry mode, and to further select for each of said modes one of a plurality of different heat settings; and
electronic control means responsive to said temperature sensing means and said input selection means for controlling the output power of said surface unit in accordance with the sensed utensil temperature, the selected cooking mode and the selected heat setting for the selected mode; said control means including means for periodically calculating the temperature difference between a predetermined reference temperature range corresponding to the selected heat setting and the sensed utensil temperature sensed by said temperature sensing means; said control means being operative in response to the selection of said Fry mode to operate said surface unit at an output power level which varies as a function of both the selected heat setting and said temperature difference when the sensed utensil temperature is less than said reference temperature range, to de-energize said surface unit when the sensed utensil temperature exceeds said reference temperature range, and to operate said surface unit at a predetermined steady state power level corresponding to the selected heat setting when the sensed utensil temperature falls within said reference temperature range.

8. The surface unit power control arrangement of claim 7 wherein control means further comprises means for comparing said sensed utensil temperature to a predetermined minimum boil reference temperature; said control means being operative in response to the selection of said Boil mode to operate said surface unit at a predetermined relatively high power level when the sensed utensil temperature is less than said predetermined minimum boil reference temperature, and to operate said surface unit at a power level corresponding to the selected heat setting when the sensed utensil temperature is greater than said minimum boil reference temperature.

9. The control arrangement of claim 8 wherein said plurality of cooking modes further includes a Warm mode, and said control means further comprises means for comparing said sensed utensil temperature with a predetermined minimum warm reference temperature and a maximum warm reference temperature corresponding to the selected heat setting, said control means being operative in response to selection of said Warm mode to operate said surface unit at a predetermined relatively low power setting when the sensed utensil temperature is less than said predetermined minimum warm reference temperature, to de-energize said surface unit when said sensed utensil temperature exceeds said maximum warm reference temperature and to operate said surface unit at a power level corresponding to the selected heat setting when the sensed utensil temperature is between said minimum and maximum warm reference temperatures; said maximum warm reference temperature being less than a utensil temperature capable of bringing water in the utensil to a boil.

10. The control arrangement of claim 7 wherein said plurality of selectable cooking modes further includes a Simmer mode, and wherein said control means is further operative in response to the selection of said Simmer mode to operate said surface unit at a third predetermined relatively high initial simmer power level when the sensed utensil temperature is less than a predetermined minimum simmer reference temperature, to operate said surface unit at a predetermined intermediate simmer power level when the sensed utensil temperature is between said minimum simmer reference temperature and a predetermined intermediate simmer reference temperature and to operate said surface unit at a power level corresponding to the selected heat setting for a sensed utensil temperature between said intermediate simmer reference temperature and a maximum simmer reference temperature, and to de-energize said surface unit when said sensed temperature exceeds said maximum simmer reference temperature; said minimum, intermediate and maximum simmer reference temperatures being selected to rapidly bring the temperature of the contents of the utensil to near its boiling temperature without boiling and to hold the contents near the boiling point without boiling.

11. The control arrangement of claim 8 wherein said plurality of selectable cooking modes further includes a Simmer mode, and wherein said control means is further operative in response to the selection of said Simmer mode to operate said surface unit at a third predetermined relatively high initial simmer power level when the sensed utensil temperature is less than a predetermined minimum simmer reference temperature, to operate said surface unit at a predetermined intermediate simmer power level when the sensed utensil temperature is between said minimum simmer reference temperature and a predetermined intermediate simmer reference temperature and to operate said surface unit at a power level determined as a function of the selected operating condition setting for sensed utensil temperature between said intermediate simmer reference temperature and a maximum simmer reference temperature and to de-energize said surface unit when said sensed temperature exceeds said maximum simmer reference temperature; said minimum, intermediate and maximum simmer reference values being selected to rapidly bring the temperature of the contents of the utensil to near its boiling temperature without boiling and to hold it near the boiling point without boiling.

12. The control arrangement of claim 9 wherein said plurality of selectable cooking modes further includes a Simmer mode, and wherein said control means is further operative in response to the selection of said Simmer mode to operate said surface unit at a third predetermined relatively high initial simmer power level when the sensed utensil temperature is less than a predetermined minimum simmer reference temperature, to operate said surface unit at a predetermined intermediate simmer power level when the sensed utensil temperature is between said minimum simmer reference temperature and a predetermined intermediate simmer reference temperature and to operate said surface unit at a power level determined as a function of the selected operating condition setting for sensed utensil temperature between said intermediate simmer reference temperature and a maximum simmer reference temperature and to de-energize said surface unit when said sensed temperature exceeds said maximum simmer reference temperature; said minimum intermediate and maximum simmer reference values being selected to rapidly bring the temperature of the contents of the utensil to near its boiling temperature without boiling and to hold it near the boiling point without boiling.

13. A surface unit power control arrangement for a cooking appliance comprising:
at least one surface unit for supporting and heating a cooking utensil placed thereon and adapted for energization by an external power supply;
temperature sensing means for sensing the temperature of a utensil supported on said surface unit;
user operable input selector means enabling a user to select one of a plurality of cooking modes, including a Simmer mode, and to select for each of said modes one of a plurality of different heat settings; each heat setting for each mode having associated with it a predetermined steady state surface unit power level and a predetermined steady state temperature range;
electronic control means responsive to said temperature sensing means and said input means for controlling energization of said surface unit in accordance with the sensed utensil temperature and selected cooking mode and heat settings, said control means being operative in said Simmer mode to operate said surface unit at a first predetermined relatively high initial simmer power level when the sensed utensil temperature is less than a predetermined minimum simmer reference temperature, to operate said surface unit at a predetermined intermediate simmer power level when the sensed utensil temperature is between said minimum simmer reference temperature and a predetermined intermediate simmer reference temperature and to operate said surface unit at a power level corresponding to the selected heat setting for a sensed utensil temperature between said intermediate simmer reference temperature and a maximum simmer reference temperature, and to de-energize said surface unit when said sensed temperature exceeds said maximum simmer reference temperature; said minimum, intermediate and maximum simmer reference temperatures and said initial, intermediate and simmer power levels being selected to rapidly bring the temperature of the contents of the utensil to near its boiling temperature without boiling and to hold the contents near the boiling point without boiling.

14. A surface unit power control arrangement for a cooking appliance comprising:
at least one surface unit for supporting and heating a cooking utensil placed thereon and adapted for energization by an external power supply;
temperature sensing means for sensing the temperature of a utensil supported on said surface unit;
user operable input selector means enabling a user to select one of a plurality of cooking modes, including a Warm mode, a Simmer mode, and a Boil mode, and to select for each of said modes one of a plurality of different heat settings; each heat setting for each mode having associated with it a predetermined steady state surface unit power level and a predetermined steady state temperature range;
electronic control means responsive to said temperature sensing means and said input means for controlling energization of said surface unit in accordance with the sensed utensil temperature and selected cooking mode and heat settings, said control means being operative in said Warm Mode to operate said surface unit at a predetermined relatively low power setting when the sensed utensil temperature is less than a predetermined minimum warm reference temperature, to de-energize said surface unit when said sensed utensil temperature exceeds a predetermined maximum warm reference temperature and to operate said surface unit at a power level corresponding to the selected heat setting when the sensed utensil temperature is between said minimum and maximum warm reference temperatures, said maximum warm reference temperature being less than a utensil temperature indicative of the presence of boiling water in the utensil; said control means being operative in said Simmer Mode to operate said surface unit at a predetermined relatively high power level for sensed utensil temperatures less then a predetermined minimum simmer reference temperature, at a predetermined intermediate power level lower than said first power level when said temperature is between the said minimum simmer reference temperature and a predetermined intermediate simmer reference temperature, at the steady state power level associated with the selected heat setting for sensed utensil temperatures between said intermediate simmer reference temperature and a predetermined maximum simmer reference temperature, and to de-energize said surface unit when said sensed temperature exceeds said maximum simmer reference temperature, said minimum, intermediate and maximum simmer reference temperatures being selected to rapidly bring the temperature of the contents of the utensil to near its boiling temperature without boiling and to hold the contents near the boiling point without boiling; and said control means being further operative in said Boil Mode to operate said surface unit at a predetermined relatively high power level when the sensed utensil temperature is less than a predetermined minimum boil reference temperature, and to operate said surface unit at a power level corresponding to the selected heat setting when the sensed utensil temperature is between said minimum boil and maximum boil reference temperature.

* * * * *